(12) United States Patent
Prakash et al.

(10) Patent No.: US 10,926,461 B2
(45) Date of Patent: Feb. 23, 2021

(54) METHODS AND APPARATUS FOR ADDITIVELY MANUFACTURING A STRUCTURE WITH IN-SITU REINFORCEMENT

(71) Applicant: The Boeing Company, Chicago, IL (US)

(72) Inventors: Om Prakash, Bangalore (IN); Megha Sahu, Bangalore (IN)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 16/146,405

(22) Filed: Sep. 28, 2018

(65) Prior Publication Data

US 2020/0101660 A1 Apr. 2, 2020

(51) Int. Cl.
| | | |
|---|---|---|
| *B29C 64/165* | (2017.01) | |
| *B29C 64/106* | (2017.01) | |
| *B33Y 10/00* | (2015.01) | |
| *B33Y 80/00* | (2015.01) | |
| *B22F 1/00* | (2006.01) | |
| *B22F 3/11* | (2006.01) | |
| *B29C 64/245* | (2017.01) | |
| *B22F 3/105* | (2006.01) | |

(Continued)

(52) U.S. Cl.
CPC .......... *B29C 64/165* (2017.08); *B22F 1/0062* (2013.01); *B22F 1/0074* (2013.01); *B22F 3/1055* (2013.01); *B22F 3/1118* (2013.01); *B29C 64/106* (2017.08); *B29C 64/245* (2017.08); *B22F 2003/1057* (2013.01); *B22F 2003/1058* (2013.01); *B29K 2995/0005* (2013.01); *B33Y 10/00* (2014.12); *B33Y 30/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 2004/0224173 | A1* | 11/2004 | Boyd | ..................... B33Y 30/00 428/500 |
| 2015/0165679 | A1* | 6/2015 | Goto | ..................... B29C 64/165 264/308 |

(Continued)

FOREIGN PATENT DOCUMENTS

| | | |
|---|---|---|
| EP | 1524049 | 4/2005 |
| WO | 2017100449 | 6/2017 |

(Continued)

OTHER PUBLICATIONS

European Search Report dated Nov. 18, 2019; Application No. EP19192867.

(Continued)

*Primary Examiner* — Mary Lynn F Theisen
(74) *Attorney, Agent, or Firm* — Perman & Green LLP

(57) ABSTRACT

A method of additive manufacturing is provided. The method includes depositing a layer of polymeric material from which an additively manufactured part is produced. The method also includes depositing a slurry upon the layer of polymeric material, wherein the slurry includes a conductive material that imparts conductive properties to the layer of polymeric material.

20 Claims, 14 Drawing Sheets

(51) Int. Cl.
 *B33Y 70/00* (2020.01)
 *B33Y 30/00* (2015.01)

(56) References Cited

U.S. PATENT DOCUMENTS

| | | | |
|---|---|---|---|
| 2015/0210013 A1 | 7/2015 | Teulet | |
| 2015/0268099 A1 | 9/2015 | Craig et al. | |
| 2016/0332370 A1* | 11/2016 | Arai | B29C 64/153 |
| 2016/0332373 A1* | 11/2016 | Kuhn | B29C 64/165 |
| 2016/0339636 A1* | 11/2016 | De Pena | B29C 64/165 |
| 2017/0165792 A1 | 6/2017 | Buller et al. | |
| 2017/0182712 A1 | 6/2017 | Scribner et al. | |
| 2017/0247552 A1* | 8/2017 | Prasad | C09D 11/10 |
| 2017/0327701 A1 | 11/2017 | Connor et al. | |
| 2018/0208785 A1* | 7/2018 | Chopra | H05K 1/092 |

FOREIGN PATENT DOCUMENTS

| | | |
|---|---|---|
| WO | 2017196330 | 11/2017 |
| WO | 2018022024 | 2/2018 |
| WO | 2018095753 | 5/2018 |

OTHER PUBLICATIONS

Ben Chapman, "Increasing Toughness of 3-D Printed Plastic Using Acetone Vapor", May 8, 2014; https://benchapman4.wordpress.com/2014/05/08/increasing-toughness-of-3d-printed-plastic-using-acetone-vapor/comment-page-1/#comment-128.

Cicala G, Latteri A, Del Curto B, Lo Russo A, Recca G, Fare S, "Engineering thermoplastics for additive manufacturing: a critical perspective with experimental evidence to support functional applications", J Appl Biomater Funct Mater. Jan. 28, 2017; 15(1);0; https://www.ncbi.nlm.nih.gov/pubmed/28134971.

REC; Forwarded by Tyler Koslow and Gauthier de Valensart; "REC 3D-releases Comprehensive Stress Test for 3D Printing Materials", Jan. 26, 2017; https://www.filaments.directory/en/blog/2017/01/27/rec-3d-releases-comprehensive-stress-test-for-3d-printing-materials.

Sam Barrett, "Developing a simple, accurate model for the mechanical strength of 3D-printed material"; Jun. 28, 2016; https://hackaday.io/project/12439-fdmproperties.

Jeanne Galatzer-Levy, "Supersonic spray delivers high-quality graphene layer", UIC Today, May 28, 2014; http://today.uic.edu/supersonic-spray-delivers-high-quality-graphene-layer.

Jonathan O'Callaghan, "Could-cobwebs-one-day-catch-falling-Planes-Spiders-sprayed-graphene-make-ultra-strong-silk"; Daily Mail, May 6, 2015; http://www.dailymail.co.uk/sciencetech/article-3069945/Could-cobwebs-one-day-catch-falling-PLANES-Spiders-sprayed-graphene-make-ultra-strong-silk.html?printingPage=true.

David Schofield, Graphene and CNTs: Commercialization After the Hype; Composites World, Sep. 28, 2017; https://www.compositesworld.com/columnsi/graphene-and-cnts-commercialization-after-the-hype.

* cited by examiner

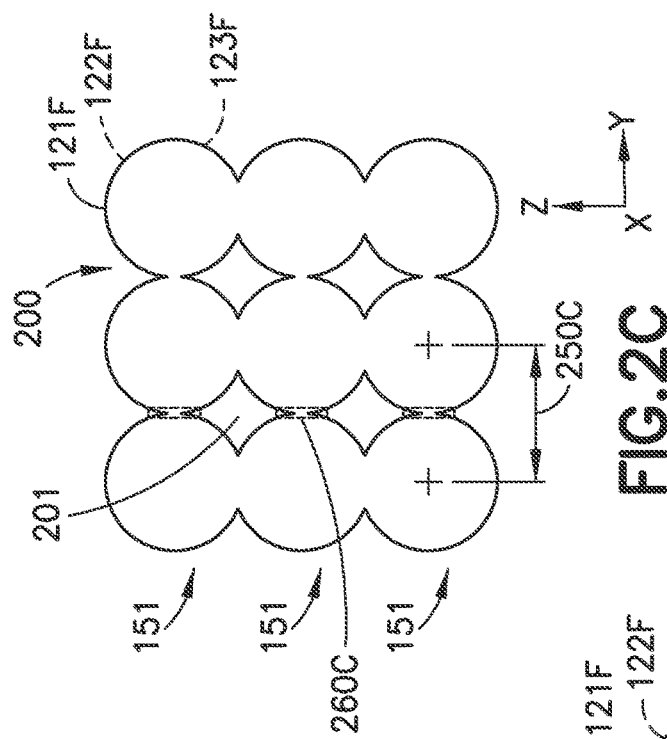
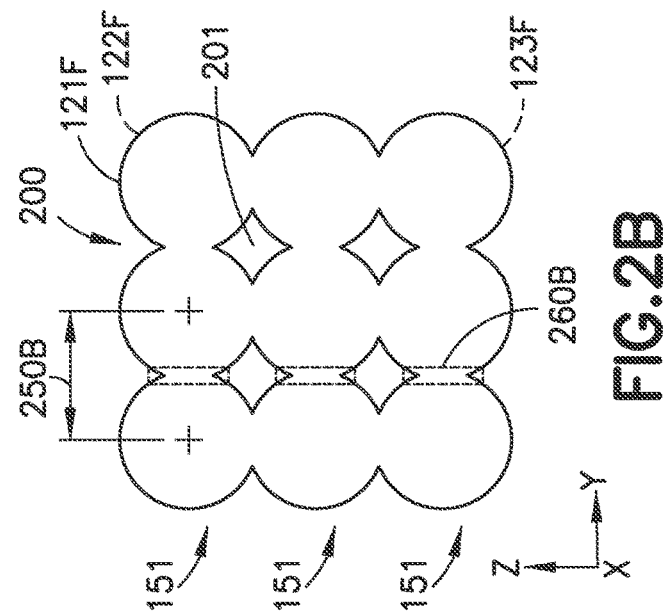
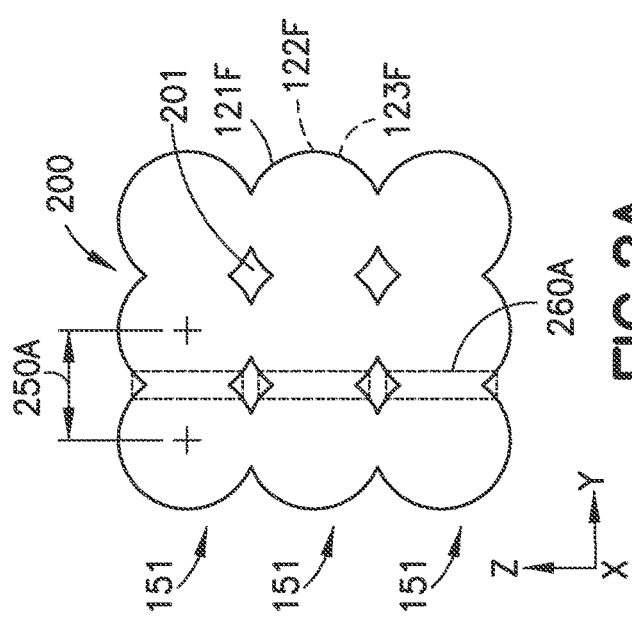

METHODS AND APPARATUS FOR ADDITIVELY MANUFACTURING A STRUCTURE WITH IN-SITU REINFORCEMENT

CROSS-REFERENCE TO RELATED APPLICATIONS

This patent application is related to U.S. patent application Ser. No. 16/146,389 and filed on Sep. 28, 2018, and U.S. patent application Ser. No. 16/146,400 and filed on Sep. 28, 2018, the disclosures of which are incorporated by reference herein in their entireties. For further identification of the aforementioned related applications, it is noted that the as filed title is the same for this patent application and the aforementioned related patent applications.

BACKGROUND

1. Field

The exemplary embodiments generally relate to additive manufacturing and more particularly to additively manufacturing structures with in-situ reinforcement.

2. Brief Description of Related Developments

Generally, in additive manufacturing, powder is spread on a build plate (or on a powder bed formed by a previous layer of powder deposited on the build plate) or filaments of material are deposited on the build plate (or on top of a previously deposited layer of filaments) in a side-by-side arrangement. The powder or filaments are then fused together to form a desired part/article of manufacture (referred to herein as a "structure"). Fusing of the particles may be achieved with lasers or any other suitable energy source configured to fuse the powder or filaments together. As the powder is deposited, voids and/or pores are formed between the particles of powder and between adjacent layers of powder formed thereby. For example, the particles of powder have a generally spherical shape which when abutted against other particles may create the voids and/or pores. Similarly, as the filaments are deposited, the cylindrical shape of the filament may result in the voids and/or pores between adjacent filaments and between adjacent layers of filaments formed thereby. The voids and pores may also result from variations in the deposition process.

The additively manufactured structures may have poor surface finishes as a result of the voids and/or pores. Further, the additively manufactured structures may exhibit anisotropic mechanical properties. For example, considering a three dimensional (X, Y, Z) structure where the filament or powder layers are deposited in the X-Y plane and are stacked on top of each other in the Z direction. For exemplary purposes only, the tensile force of the structure in the Z direction may be about 40% to about 55% of the tensile force of the structure in the X-Y plane. This anisotropic behavior may be due to the presence of the voids and/or pores between the layers of the powder or filaments.

In addition to the above, structures can be produced with additive manufacturing using a variety of base materials (e.g., metals, polymers, and ceramics); however, while the base material may be chosen, conventional additive manufacturing techniques do not provide the ability to fine tune or change properties (e.g., such as conductivity) of the structure formed by the base material. For example, if the base material is a conductor, the resulting structure formed with the base material will be conductive. Likewise, if the base material is an insulator, the resulting structure formed with the base material will be insulative and, conventionally, additive manufacturing processes do not provide for imparting conductivity to the insulating structure.

SUMMARY

Accordingly, apparatuses and methods intended to address, at least, the above-identified concerns would find utility.

The following is a non-exhaustive list of examples, which may or may not be claimed, of the subject matter according to the present disclosure.

One example of the subject matter according to the present disclosure relates to a method of additive manufacturing, the method comprises: depositing a layer of polymeric material from which an additively manufactured part is produced; and depositing a slurry upon the layer of polymeric material, wherein the slurry includes a conductive material that imparts conductive properties to the layer of polymeric material.

Another example of the subject matter according to the present disclosure relates to a method of additive manufacturing, the method comprises: depositing a layer of polymeric material; and depositing a slurry upon the layer of polymeric material, wherein the slurry includes a conductive material that imparts conductive properties to the layer of polymeric material; wherein the layer of polymeric material and the slurry are alternately deposited to form stacked layers of polymeric material with the slurry interstitially disposed between the stacked layers of polymeric material, the slurry at least partially filling one or more of voids and pores between adjacent layers of polymeric material in the stacked layers of polymeric material so as to form conductive pathways between the adjacent layers of polymeric material.

Still another example of the subject matter according to the present disclosure relates to an additively manufactured part comprising: at least one layer of polymeric material; and a conductive material disposed on the at least one layer of polymeric material, where the conductive material is deposited upon the at least one layer of polymeric material as a slurry so as to at least partially fill one or more of voids and pores in the at least one layer of polymeric material, wherein the conductive material imparts conductive properties to the layer of polymeric material.

Yet another example of the subject matter according to the present disclosure relates to a method of additive manufacturing, the method comprises: depositing a layer of polymeric material from which an additively manufactured part is produced; and depositing a slurry upon the layer of polymeric material, wherein the slurry includes a barrier material that imparts properties of impermeability to the layer of polymeric material.

Still another example of the subject matter according to the present disclosure relates to a method of additive manufacturing, the method comprises: depositing a layer of polymeric material; and depositing a slurry upon the layer of polymeric material, wherein the slurry includes a barrier material that that imparts properties of impermeability to the layer of polymeric material; wherein the layer of polymeric material and the slurry are alternately deposited to form stacked layers of polymeric material with the slurry interstitially disposed between the stacked layers of polymeric material, the slurry at least partially filling one or more of voids and pores between adjacent layers of polymeric material in the stacked layers of polymeric material so as to form one or more barriers between the adjacent layers of polymeric material, where the one or more barriers include the properties of impermeability.

Another example of the subject matter according to the present disclosure relates to an additively manufactured part comprising: at least one layer of polymeric material; and a barrier material disposed on the at least one layer of polymeric material, where the barrier material is deposited upon the at least one layer of polymeric material as a slurry so as to at least partially fill one or more of voids and pores in the at least one layer of polymeric material, wherein the barrier material that imparts properties of impermeability to the layer of polymeric material.

BRIEF DESCRIPTION OF THE DRAWINGS

Figure 1A:
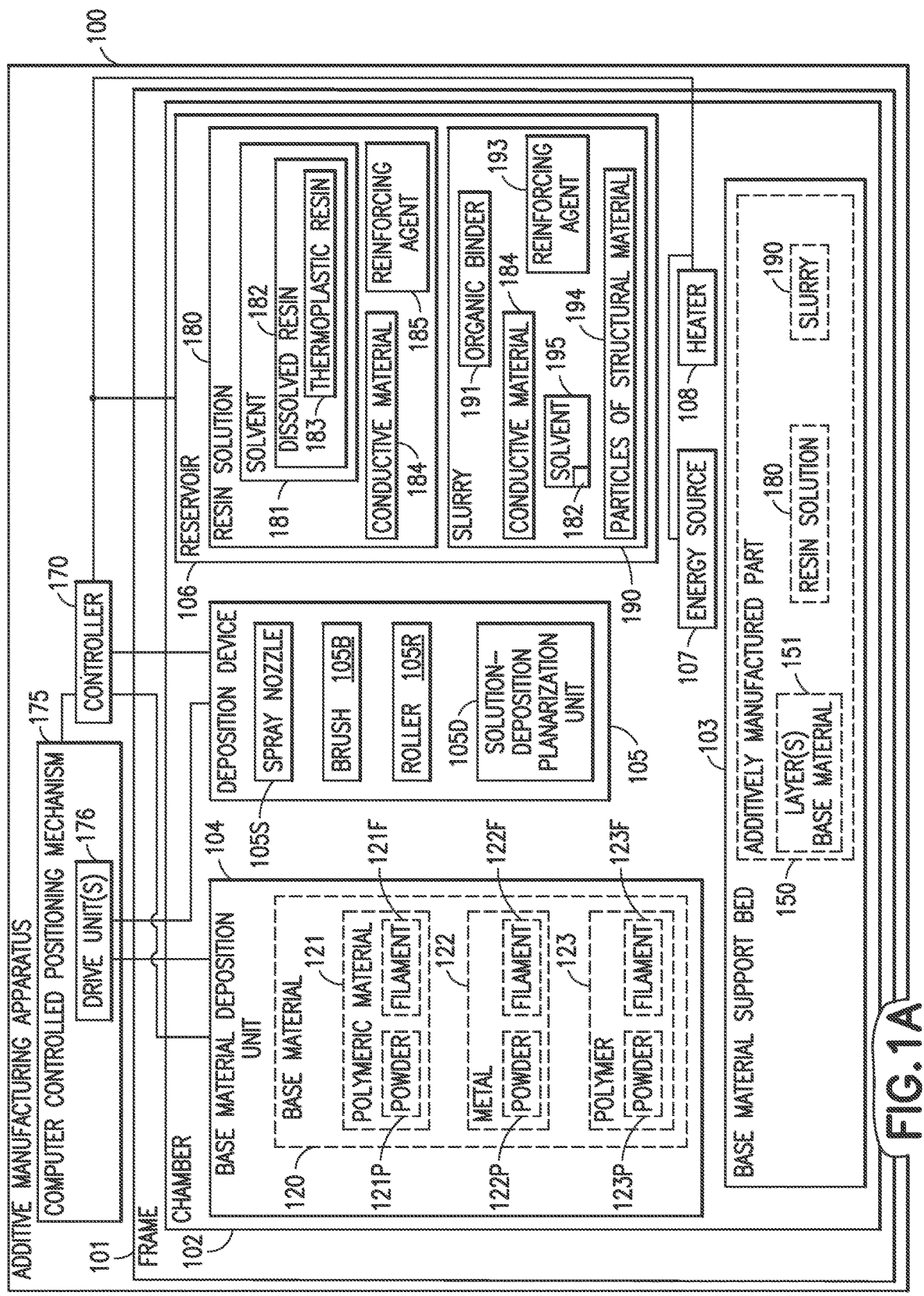
Figure 1B:
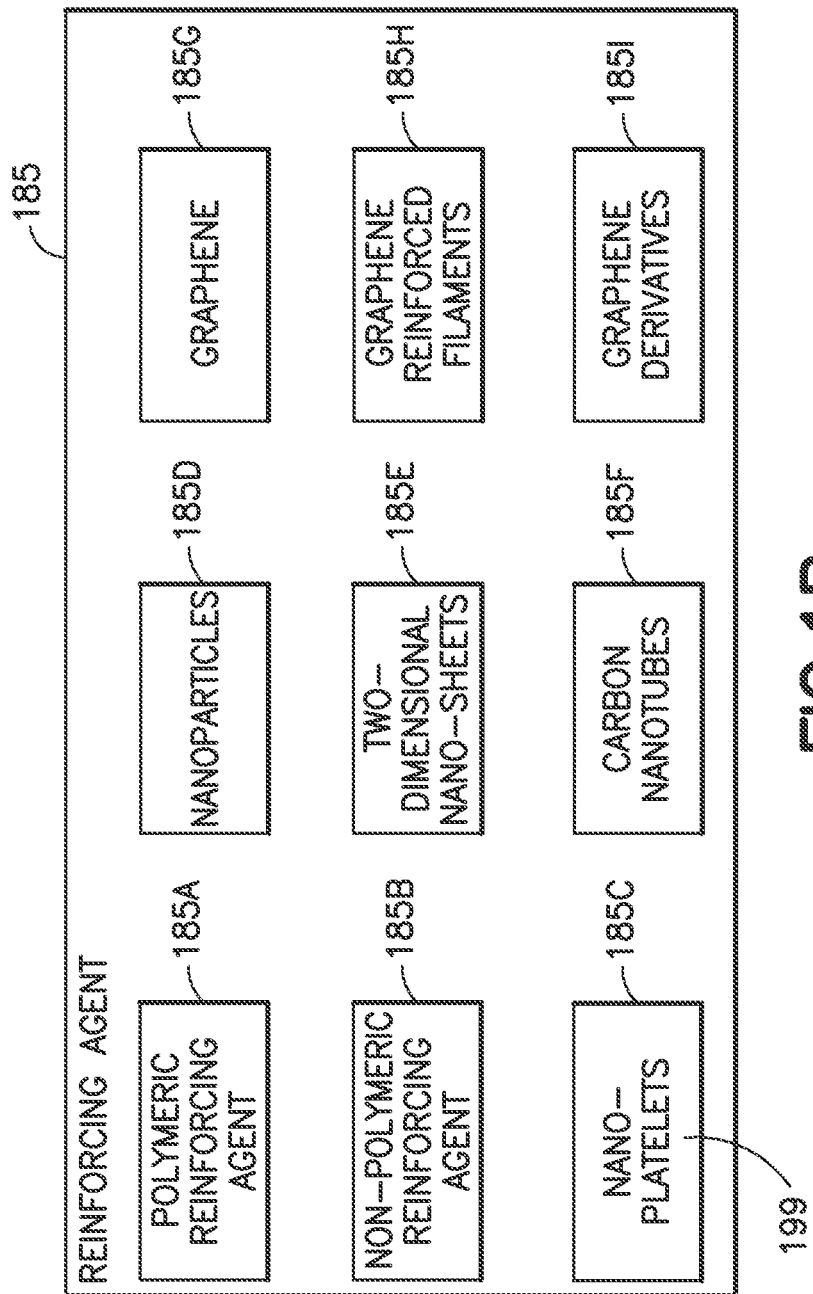
Figure 1C:
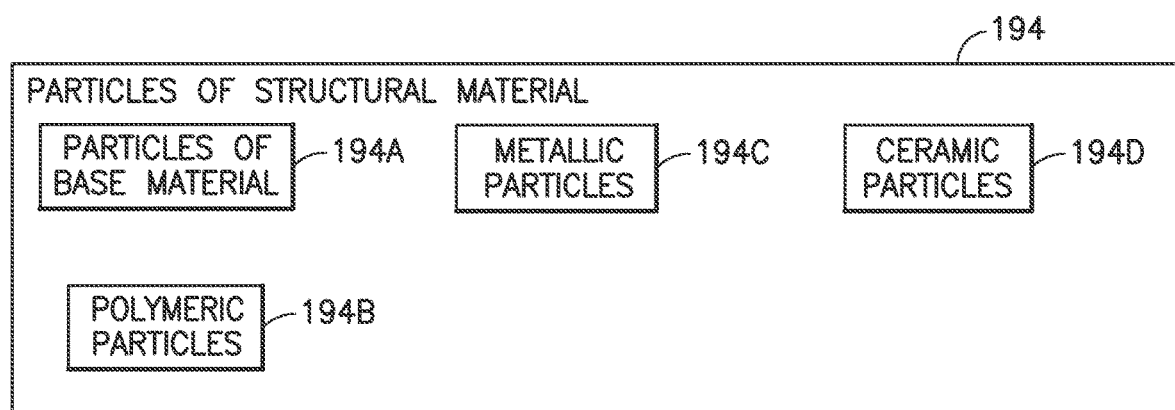
Figure 1D:
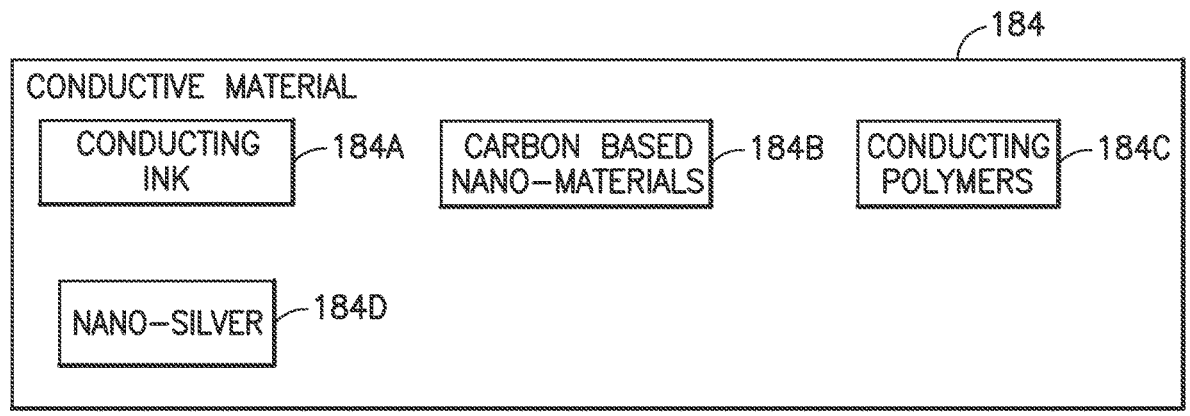
Figure 1E:
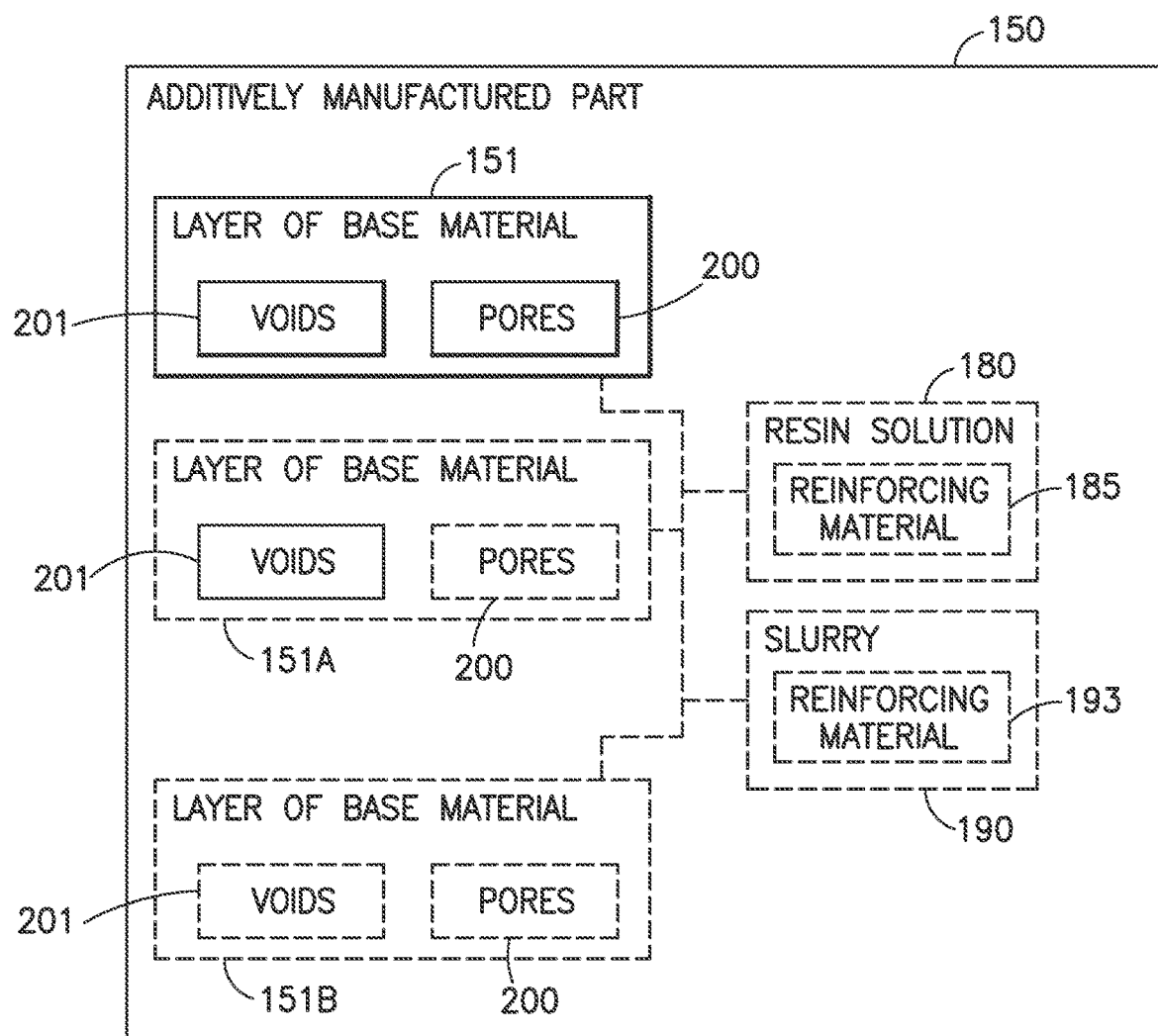
Figure 3A:
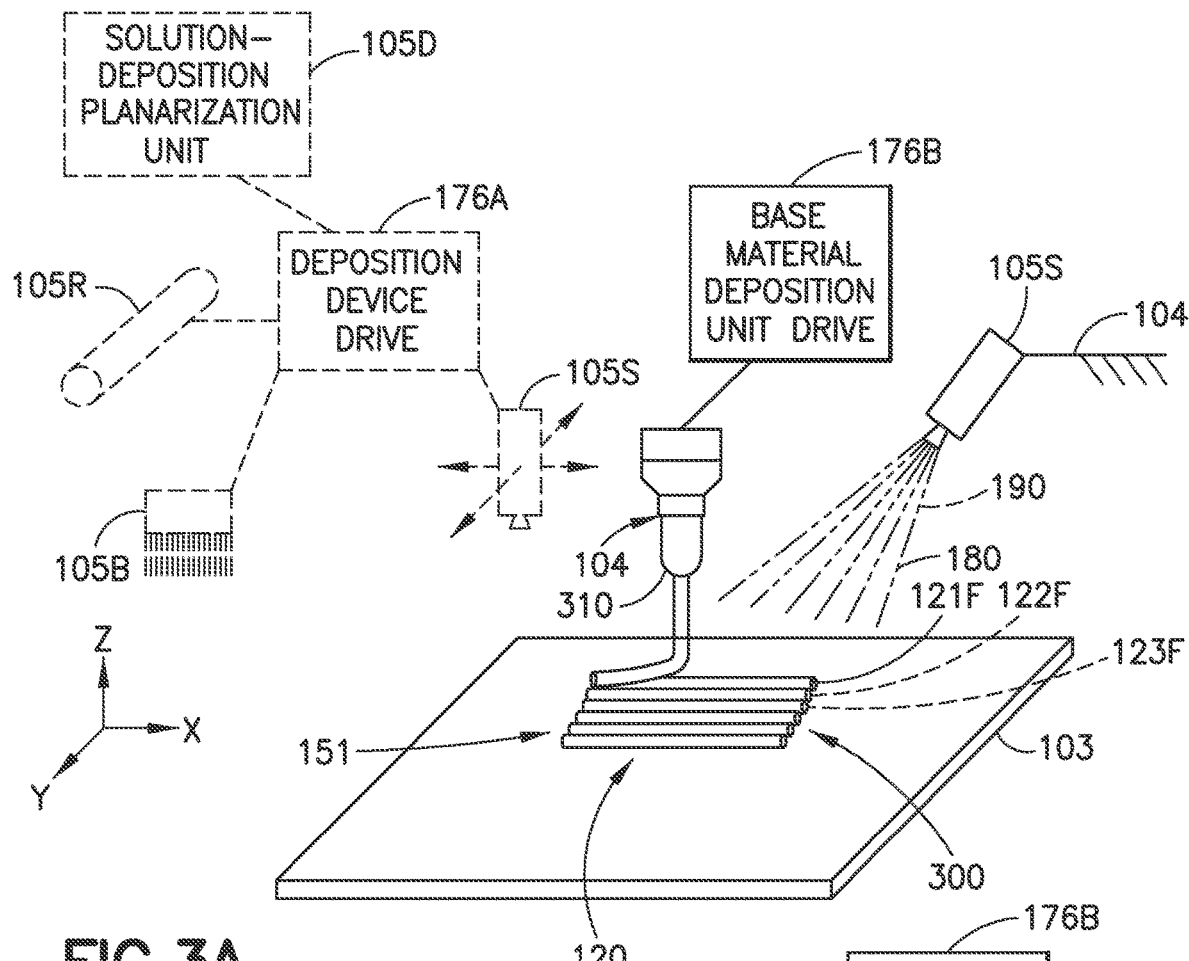
Figure 3B:
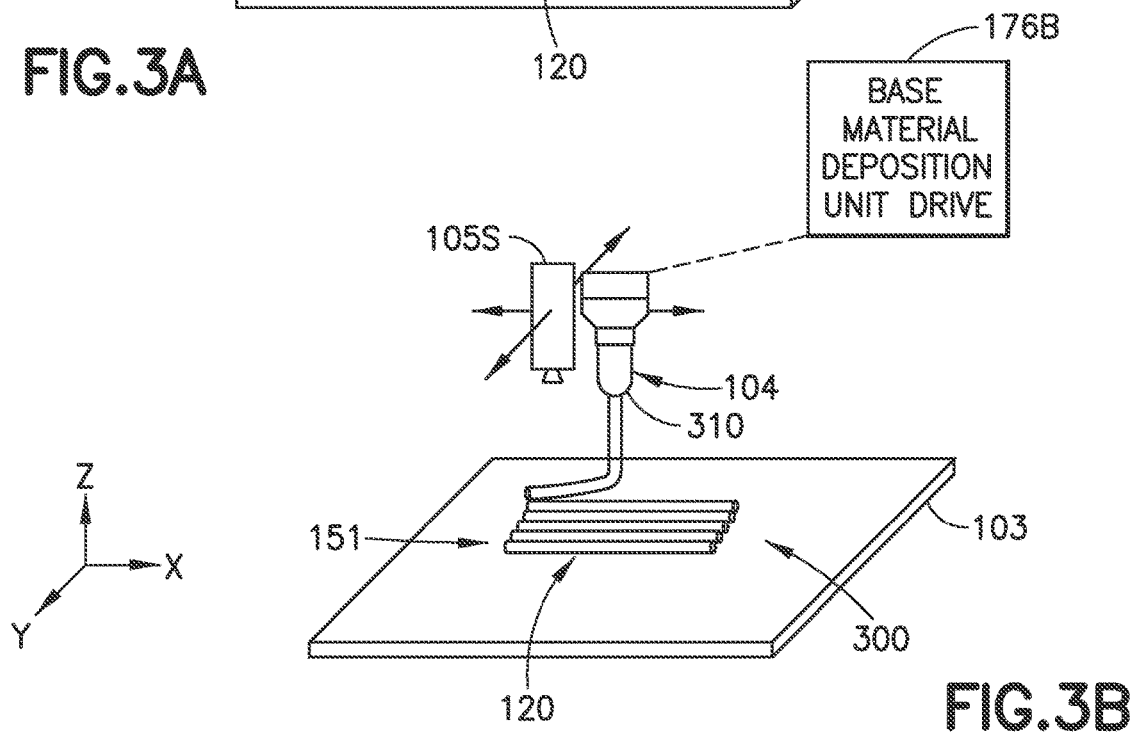
Figure 4A:
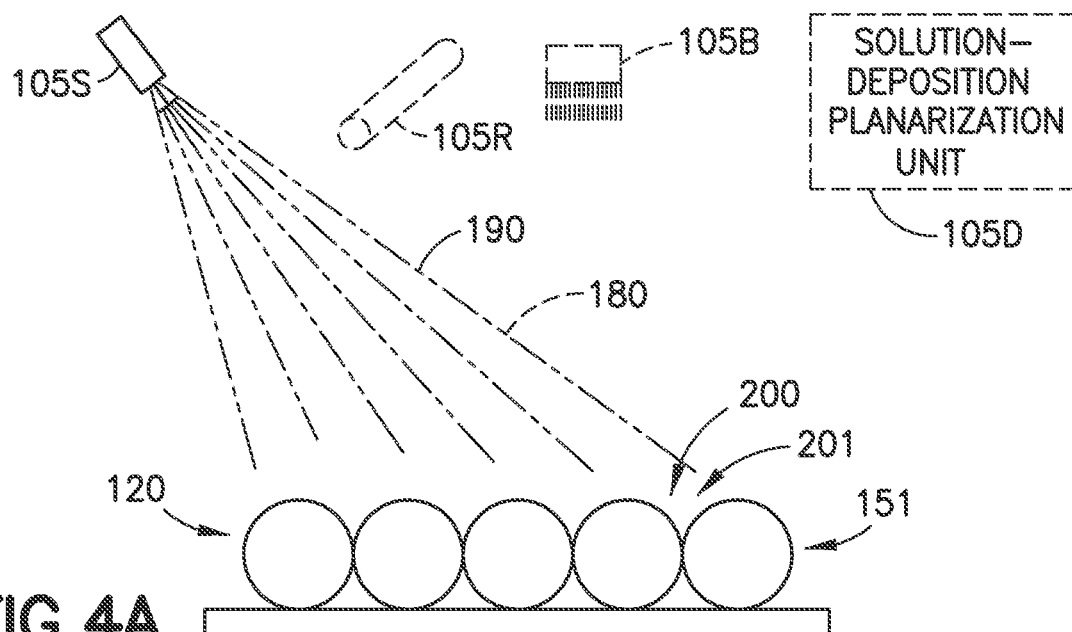
Figure 4B:
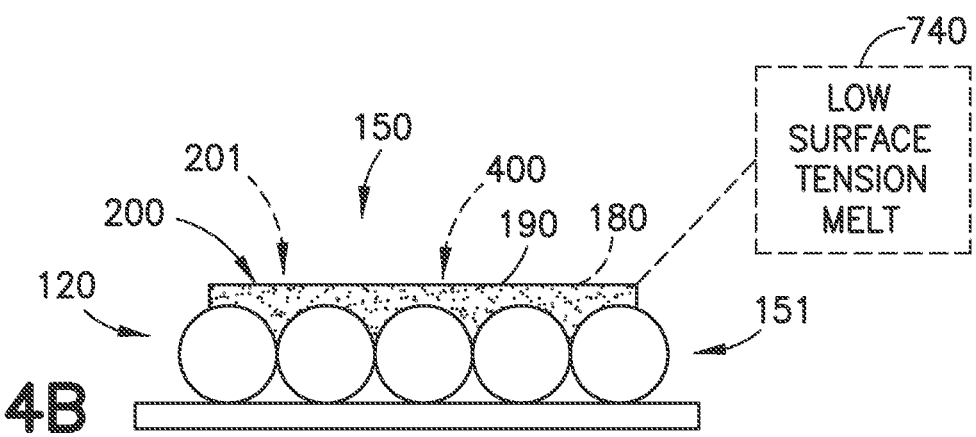
Figure 4C:
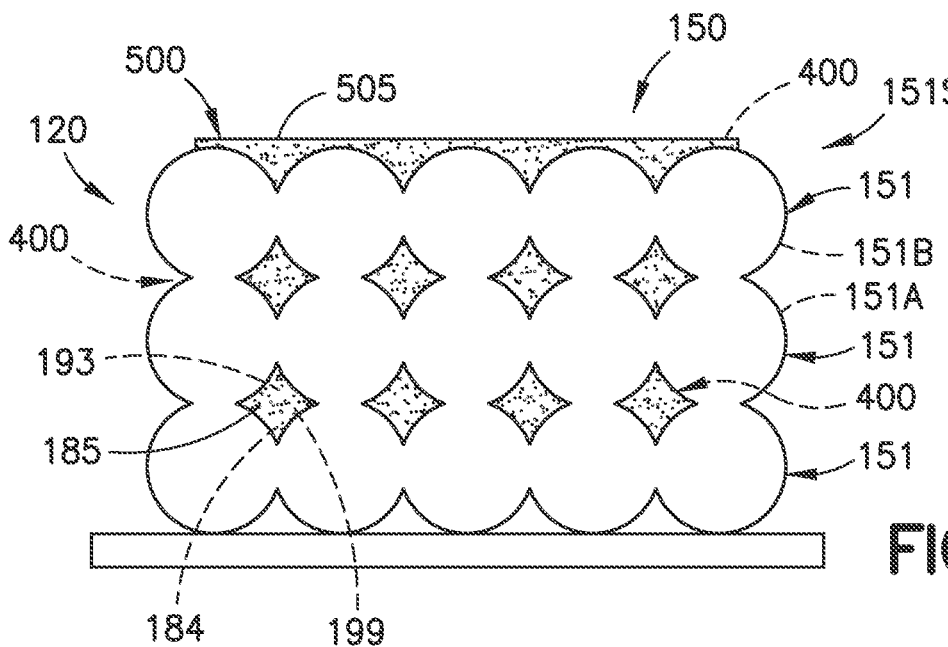
Figure 5A:
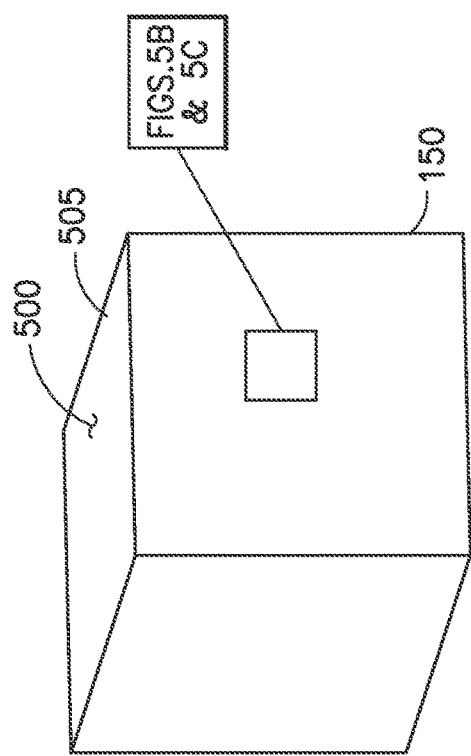
Figure 5B:
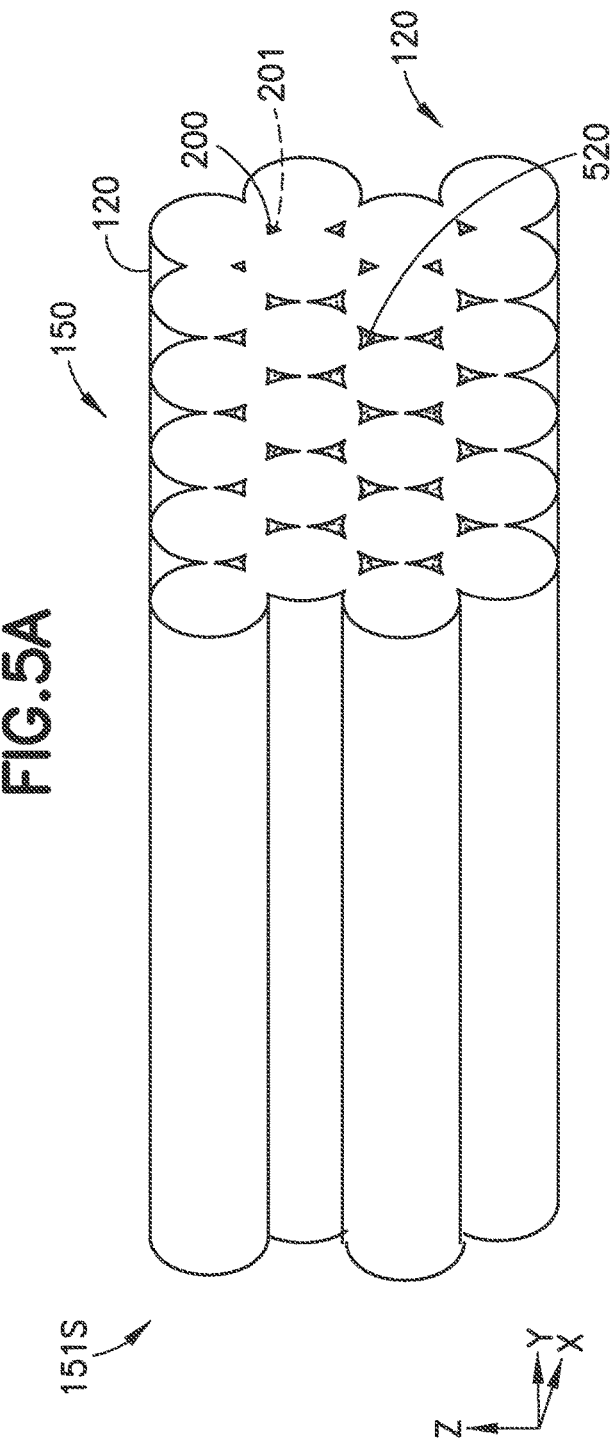
Figure 5C:
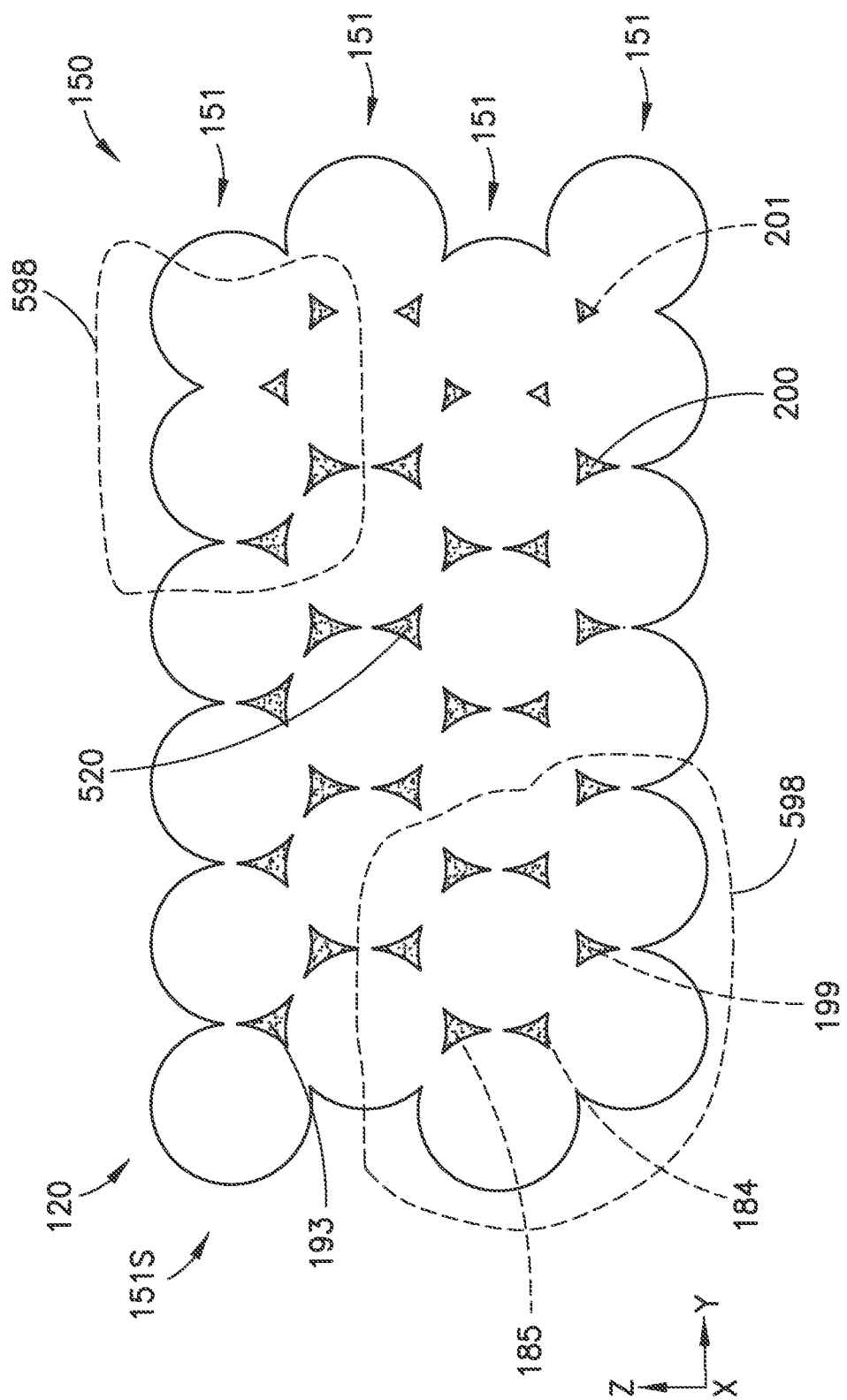
Figure 6:
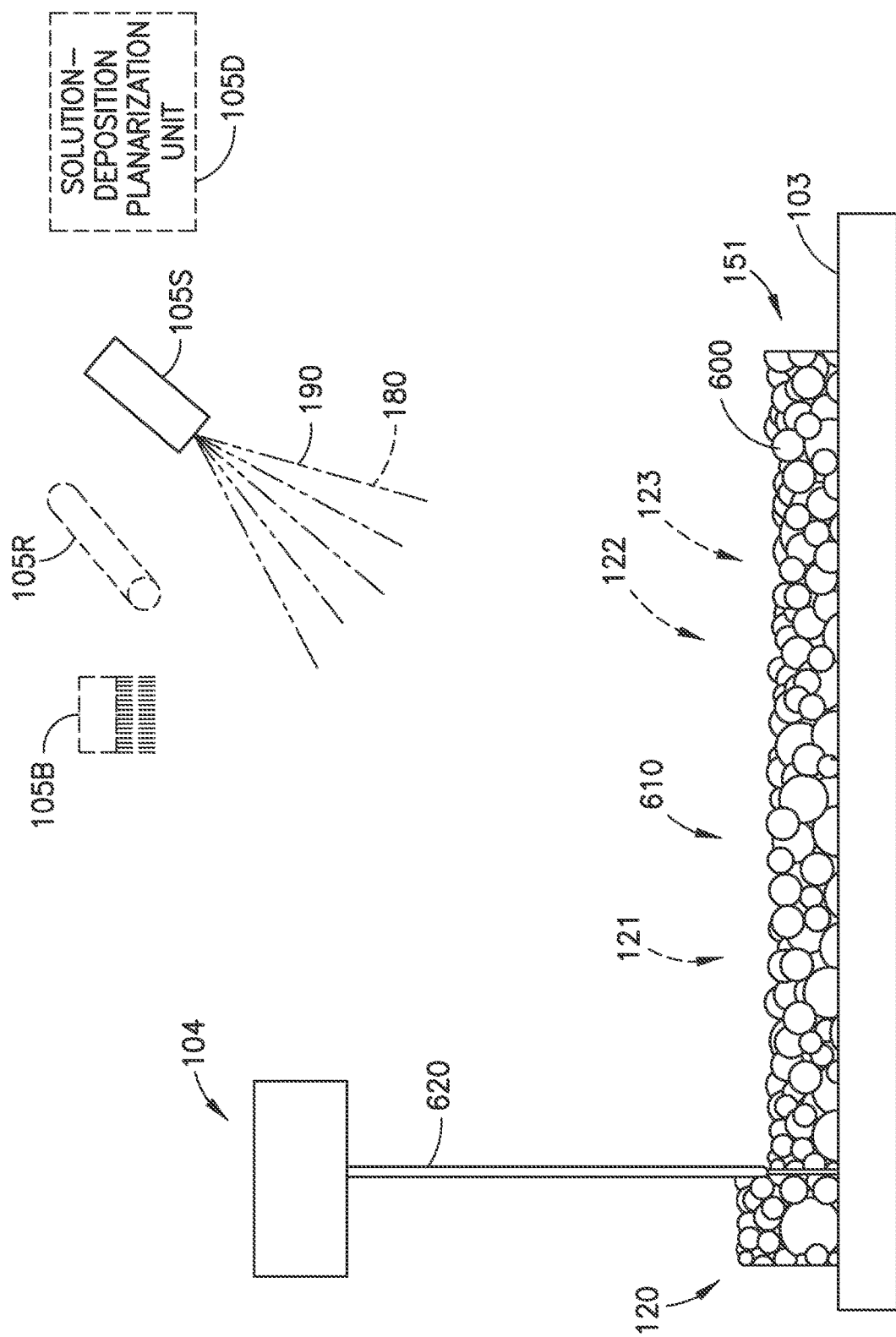
Figure 8:
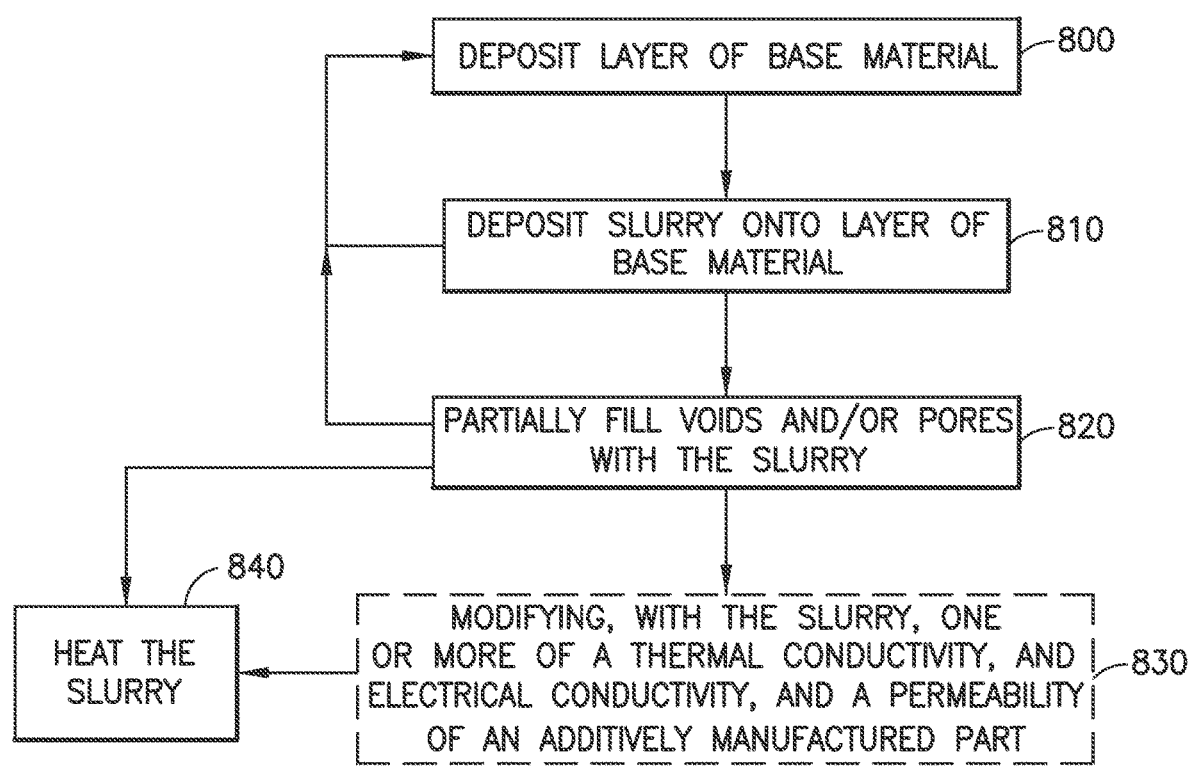
Figure 9:
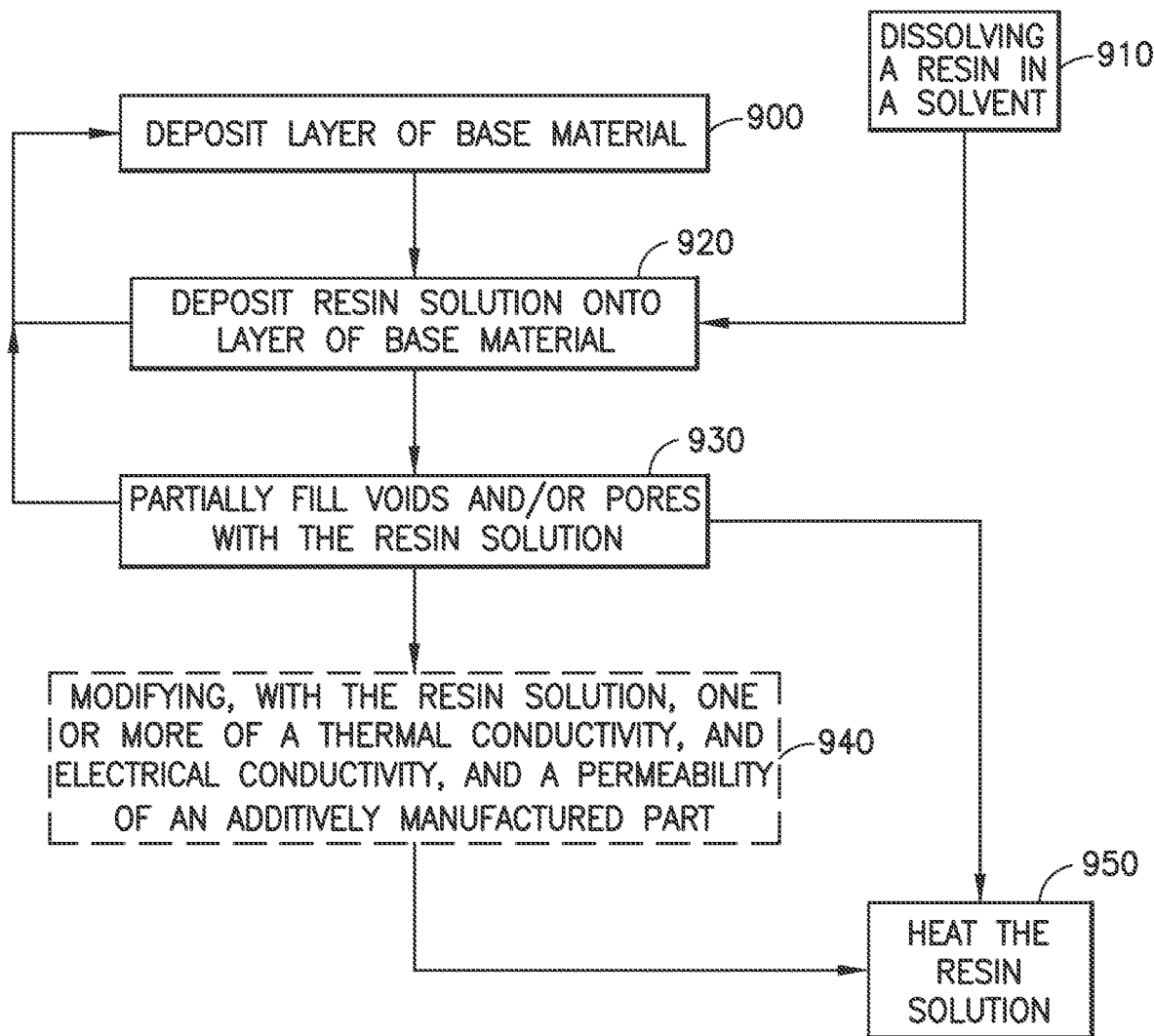
Figure 10:
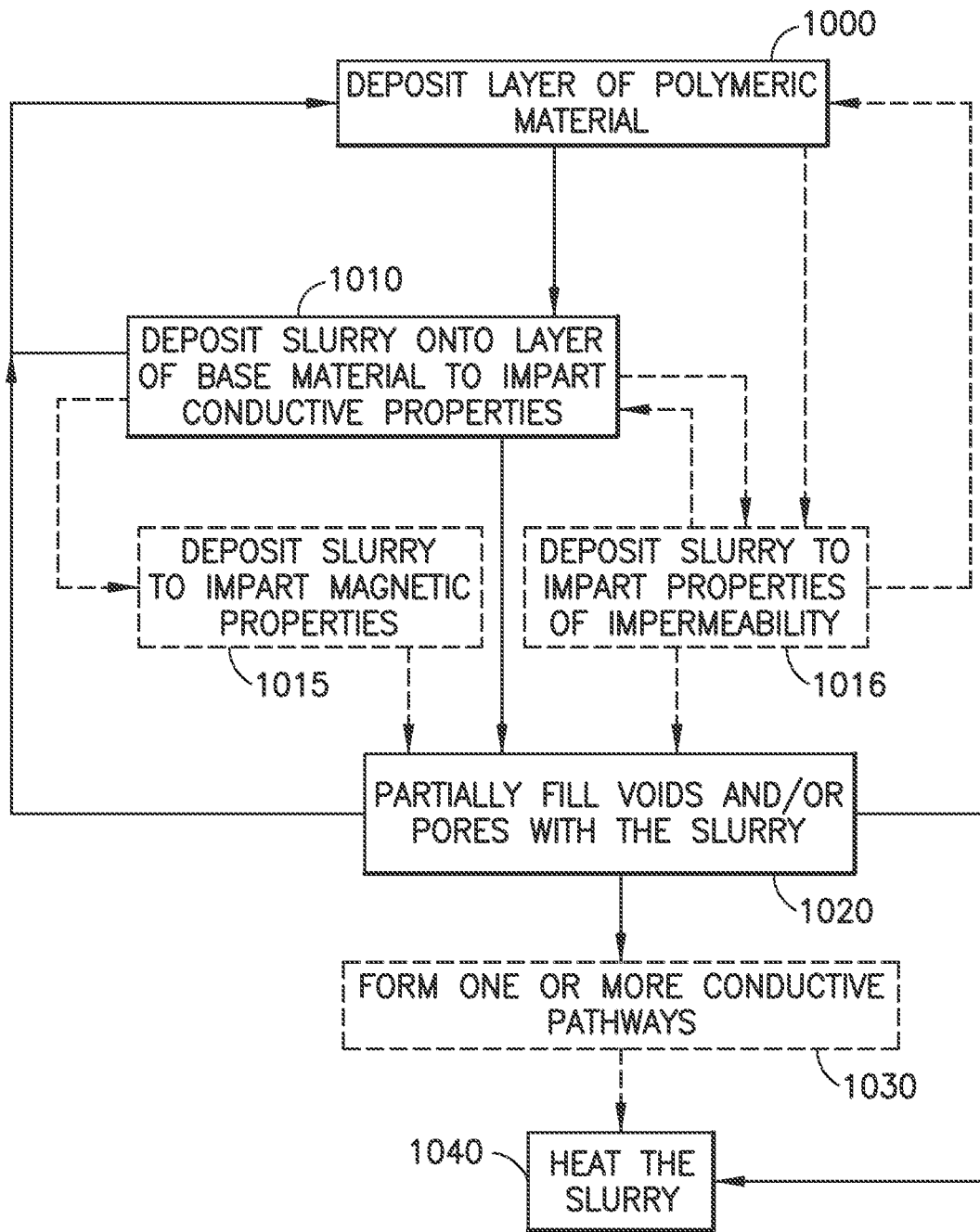

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a schematic block diagram of an additive manufacturing apparatus in accordance with aspects of the present disclosure;

FIG. 1B is a schematic block diagram of a reinforcing agent/material in accordance with aspects of the present disclosure;

FIG. 1C is a schematic block diagram of a particle of structural material in accordance with aspects of the present disclosure;

FIG. 1D is a schematic block diagram of a conductive material in accordance with aspects of the present disclosure;

FIG. 1E is a schematic block diagram of an additively manufactured part (also referred to herein as an additively manufactured structure") formed by the additive manufacturing apparatus of FIG. 1A and including one or more of the reinforcing agent, the particle of structural material, and the conducting material of FIGS. 1B, 1C, and 1D in accordance with aspects of the present disclosure;

FIGS. 2A, 2B, and 2C are exemplary end view illustrations of filaments of material deposited by the additive manufacturing apparatus of FIG. 1A with varying degrees of "air gap" between the filaments in accordance with aspects of the present disclosure;

FIG. 3A is an exemplary illustration of the additive manufacturing apparatus of FIG. 1A in accordance with aspects of the present disclosure;

FIG. 3B is an exemplary illustration of the additive manufacturing apparatus of FIG. 1A in accordance with aspects of the present disclosure;

FIGS. 4A, 4B, and 4C are exemplary end view illustrations of a deposition of filaments of material with the additive manufacturing apparatus of FIG. 1A showing a progressive stacking of layers of the filaments in accordance with aspects of the present disclosure;

FIG. 5A is a perspective view of an exemplary additively manufactured part in accordance with aspects of the present disclosure;

FIG. 5B is a perspective view of a portion of the additively manufactured part of FIG. 5A in accordance with aspects of the present disclosure;

FIG. 5C is an end view illustration of the portion of the additively manufactured part of FIG. 5B in accordance with aspects of the present disclosure;

FIG. 6 is an exemplary illustration of the additive manufacturing apparatus of FIG. 1A in accordance with aspects of the present disclosure;

FIGS. 7A and 7B are exemplary side view illustrations of a deposition of powder with the additive manufacturing apparatus of FIG. 1A showing a progressive stacking of layers of the powder in accordance with aspects of the present disclosure;

FIG. 8 is an exemplary flow diagram of a method of additive manufacturing in accordance with aspects of the present disclosure;

FIG. 9 is an exemplary flow diagram of a method of additive manufacturing in accordance with aspects of the present disclosure; and FIG. 10 is an exemplary flow diagram of a method of additive manufacturing in accordance with aspects of the present disclosure.

DETAILED DESCRIPTION

Referring to FIG. 1A, an additive manufacturing apparatus 100 is illustrated. In one aspect, the additive manufacturing apparatus 100 is configured to produce an additively manufactured part 150 by, material extrusion (e.g., Fused Filament Fabrication, Fused Deposition Modeling, etc.) where the base material 120 is extruded through a nozzle or orifice in tracks or beads (i.e., filaments 121F, 122F, 123F), which are deposited on a base material support bed 103 and then consolidated (e.g., heated to bond the filaments together) to form the additively manufactured part 150. In another aspect, the additive manufacturing apparatus 100 is configured to produce the additively manufactured part 150 by directed energy deposition (e.g., laser metal deposition, laser engineered net shaping, direct metal deposition, etc.) where the base material 120 (as a powder or wire) is fed into a melt pool which has been generated on the surface of the additively manufactured part 150 where it adheres to the underlying part or layers by using an energy source 107, such as a laser or electron beam. In still another aspect, the additive manufacturing apparatus 100 is configured to produce the additively manufactured part 150 by powder bed fusion (e.g., selective laser sintering, direct metal laser sintering, laser melting, selective heat sintering, multi-jet fusion, etc.) where the base material 120, in a powdered form (e.g., powder 121P, 122P, 123P), is deposited on the base material support bed 103 and consolidated (e.g., heated to bond the powder particles together) using the energy source 107 to form the additively manufactured part 150.

As the base material 120 is deposited onto the base material support bed 103, adjacent previously deposited filaments 121F, 122F, 123F, adjacent previously deposited powder 121P, 122P, 123P, or adjacent previously deposited base material 120 (e.g., deposited as a melt pool or slurry and at least partially solidified) at least partially adhere to each other. In some instances this partial adherence forms voids 201 and/or pores 200 (FIGS. 2A, 2B, 2C) to form between layers 151 of base material 120 and/or between adjacent filaments 121F, 122F, 123F, particles 600 (see FIG. 6) of powder 121P, 122P, 123P, or previously deposited partially solidified base material 120 within a common layer 151. These voids 201 and/or pores 200 may lead to anisotropic mechanical properties of the additively manufactured part 150.

The aspects of the present disclosure provide for in-situ (e.g., during the formation of the additively manufactured part 150 with the additive manufacturing apparatus 100) reinforcement of the additively manufactured part 150. In accordance with the aspects of the present disclosure, a reinforcing agent/material 185, 193 is deposited, during the fabrication of the additively manufactured part 150, onto each (or at least one) layer 151 of base material 120 after the deposition of each (or the at least one) layer 151 of base material 120. The reinforcing agent 185, 193 settles in the interstitial voids 201 and/or pores 200 (FIGS. 2A, 2B, 2C) created by un-melted portions of the base material 120 and/or partially fused portions of the base material 120, where the reinforcing agent 185, 193 at least partially fills the voids 201 and/or pores 200 (FIGS. 2A, 2B, 2C) and effects densification of the additively manufactured part 150.

The reinforcing agent 185, 193 may be deposited in the form of a resin (or polymer) solution 180 or a slurry 190, where the resin solution 180 or slurry 190 is sprayed, brushed, rolled, or applied in any other suitable manner onto the respective layer 151 of base material 120. The resin solution 180 may be prepared by dissolving any suitable resin, such as thermoplastic resin 183, in a suitable solvent 181 (e.g., to form a dissolved resin 182) with the reinforcing agent 185 held in suspension. The slurry 190 may be formed by optimizing (e.g., depending on a design of a spray nozzle, desired viscosity for feeding the slurry through a distribution system, etc.) an amount of suitable solvent 195 (which may include a dissolved resin 182, such as the thermoplastic resin 183), particles of a structural material 194, and a reinforcing agent 193 for combination into the slurry 190.

The solvent 181,195 may be a low surface tension solvent such as acetone, ethanol, N-Methyly-2-Pyrrolidone (NMP), N,N-dimethyl formamide or any other suitable solvent. As an example, of a low surface tension, the solvent may have a surface tension of about 22 mN/m to about 41 mN/m. In other aspects the solvent may have a surface tension may be less than about 22 mN/m or greater than about 41 mN/m. In still other aspects the solvent may have a surface tension that is less than the surface tension of water (e.g., less than about 73 mN/m).

Referring also to FIG. 1B, the reinforcing agent 185, 193 may be a polymeric reinforcing agent 185A or non-polymeric reinforcing agent 185B. For example, the reinforcing agent 185, 193 may include, but is not limited to, one or more of nanoparticles 185D, two-dimensional nano-sheets 185E (e.g., organic or inorganic), carbon nanotubes 185F, nano-platelets 185C (e.g., nano-clay, transition metal dichalcogenides (e.g., such as MoS2 and WS2), etc.), graphene 185G, graphene reinforced filaments 185H, and graphene derivatives 185I (e.g., including but not limited to hydrogenated graphene (graphane), fluorinated graphene (fluorographene), oxidized graphene (graphene oxide), and graphene introduced by acetylenic chains (graphyne and graphdiyne)). Referring also to FIG. 1C, the particles of the structural material 194 include, but are not limited to, one or more of polymeric particles 194B (that in one aspect are different than the base material 120 and in other aspects are the same as the base material 120), particles of the base material 194A, metallic particles 194C (that in one aspect are different than the base material 120 and in other aspects are the same as the base material 120), and ceramic particles 194D. Where the particles of the structural material 194 include metallic particles 194C, the slurry 190 may include any suitable organic binder 191 (see FIG. 1) (noting that the particles of structural material 194 may function as the organic binder 191 where the particles of structural material 194 are, e.g., polymeric or a polymer). In one aspect, the conversion of the combination of the solvent 195, the particles of structural material 194 and the reinforcing agent 193 to the slurry 190 may be aided by the application of thermal energy or any other suitable processing.

In one aspect, the resin solution 180 and/or slurry 190 includes a conductive material 184. Referring also to FIG. 1D, the conductive material 184 may be any suitable conductive material including, but not limited to, conducting ink 184A, carbon based nano-materials 184B (such as, e.g., the carbon nanotubes 185F, graphene 185G, the graphene reinforced filaments 185H, and the graphene derivatives 185I), conducting polymers 184C, and nano-silver 184D (or other nano-metals).

The aspects of the present disclosure provide for the manufacture of an additively manufactured part 150 having substantially the same mechanical properties in both the X-Y plane (see FIGS. 5A-5C) and the Z direction where the resin solution 180 and/or slurry 190 settles (e.g., fills in) the voids 201 and/or pores 200 (FIGS. 2A, 2B, 2C) that may be generated by the partial melting of the base material 120 (or formed in any other manner) so as to densify the additively manufactured part 150. The aspects of the present disclosure provide for bonding between adjacent layers 151, between adjacently deposited filaments 121F, 122F, 123F, and between adjacently deposited particles 600 (FIG. 6) of powder 121P, 122P, 123P.

The aspects of the present disclosure also provide for the modification or tuning of the conductive properties of the additively manufactured part 150. For example, where the additively manufactured part 150 is constructed of a non-conductive base material 120, the conductive material 184 of the resin solution 180 and/or slurry 190 deposited between one or more layers 151 of the additively manufactured part 150 may provide any suitable thermally and/or electrically conductive pathways through the additively manufactured part 150. Where the additively manufactured part 150 is constructed of a conductive base material 120, the resin solution 180 and/or slurry 190 deposited between one or more layers 151 of the additively manufactured part 150 may have as a reinforcing agent 185, 193 the particles of structural material 194 or a non-conductive material that is present in sufficient quantities to thermally and/or electrically isolate one or more layers 151 of the additively manufactured part from one or more other layers of the additively manufactured part 150. The aspects of the present disclosure may also provide the additively manufactured part 150 with barrier properties, such as, e.g., properties of impermeability. For example, the nano-platelets 185C form a barrier material 199 (FIG. 1B) that effects or forms a barrier 400 on an exterior surface 500 (FIGS. 4C, 5, 7B) of the additively manufactured part 150 or the barrier 400 between one or more layers 151 (FIGS. 4C, 7B) of the additively manufactured part 150, where the barrier 400 substantially prevents passage of fluids (e.g., gas, liquid, etc.).

The aspects of the present disclosure provide for the in-situ reinforcement of additively manufactured parts 150 during manufacturing that is not energy intensive and without post processing of the additively manufactured part 150 (e.g., without processing steps to reinforce the additively manufactured part after manufacture of the part by additive manufacturing). The aspects of the present disclosure may also be retrofit/integrated into existing three-dimensional printers used for additive manufacturing. The aspects of the present disclosure may also provide the additively manufactured part 150 with spatially variable properties (e.g., conductive and/or barrier properties at predetermined areas of the additively manufactured part 150).

Referring now to FIGS. 1A, 3A, and 3B, the additive manufacturing apparatus 100 may be configured to manufacture the additively manufactured part 150 with any suitable polymeric material 121, any suitable metal 122, or any suitable polymer 123. The additive manufacturing apparatus 100 includes a frame 101, a base material support bed 103, a base material deposition unit 104 (to deposit the base material 120), a deposition device 105, a reservoir 106, a computer controlled positioning mechanism 175, a controller 170, a heater 108, and any suitable energy source 107 (e.g., to heat the deposited base material 120 for fusing/consolidating the base material 120). The base material support bed 103 is coupled to the frame 101 in any suitable manner. The base material deposition unit 104 is movably coupled to the frame 101 in any suitable manner and is disposed above the base material support bed 103. The base material deposition unit 104 is configured to deposit one or more layers 151 of the base material 120 (either in powder 121P, 122P, 123P or filament 121F, 122F, 123F form) upon the base material support bed 103.

The deposition device 105 is coupled to the frame so as to be positioned (either fixed or movably) relative to the frame 101 and is configured so as to deposit the resin solution 180 and/or slurry 190 upon the one or more layers 151 of base material 120, in situ with the deposition of the one or more layer 151 of base material 120. In one aspect, the deposition device 105 includes a spray nozzle 105S that is fixed (e.g., stationarily coupled to the frame 101—see FIG. 3A) relative to the base material support bed 103. In another aspect, the deposition device 105 is movably coupled to frame 101. For example, the deposition device 105 and the base material deposition unit 104 may be movably coupled to the frame by a computer controlled positioning mechanism 175 having at least one drive unit 176. In one aspect, each of the base material deposition unit 104 (illustrated for exemplary purposes in FIGS. 3A and 3B as being configured to deposit filaments of base material) and the deposition device 105 are coupled to a respective one of a base material deposition unit drive 176B and a deposition device drive 176A so as to be movable relative to each other and the base material support bed 103 (see FIG. 3A). In another aspect, the base material deposition unit 104 and the deposition device 105 are configured so as to move together as a single unit relative to the frame 101 and the base material support bed 103 (see FIG. 3B). For example, the deposition device may be coupled to the base material deposition unit 104, so that both are movable as a single unit with by base material deposition unit drive 176B. The controller 170 is configured to control at least positioning movement (such as in the X-Y plane and/or in the Z direction) of one or more of the base material deposition unit 104 and the deposition device 105, and in some aspects the base material support bed 103, so as to deposit the base material 120, the resin solution 180, and/or the slurry 190 in the manner(s) described herein.

The deposition device 105, may be configured as, e.g., the spray nozzle 105S (e.g., where the resin solution 180 or slurry 190 exits the deposition device 105 through the spray nozzle), a brush 105B, a roller 105R, or as a solution-deposition planarization unit 105D (see FIGS. 1A and 3A) or any other suitable deposition apparatus configured to deposit the resin solution 180 and/or slurry 190 onto the layers 151. In one aspect, the deposition device 105 is configured to effect deposition of the resin solution 180 upon the layer(s) 151 of base material 120 by application of a low surface tension melt 740 (see FIG. 7A) (e.g., the thermoplastic resin 183 in the resin solution 180 has a lower molecular weight than the base material 120 (but can have the same or different chemistry as the base material 120) so that the thermoplastic resin 183 melts at a lower temperature than the base material 120). Depending on the configuration of the deposition device 105, where the deposition device 105 is movable, the deposition device drive 176A is suitably configured to move the deposition device 105 so that the resin solution 180 and/or slurry 190 is deposited by spraying, brushing, rolling, or solution-deposition planarization. While the base material deposition unit 104 and the deposition device 105 are described as being movable relative to the base material support bed 103, in other aspects, the base material support bed 103 may be movable relative to the one or more of the base material deposition unit 104 and the deposition device 105.

With reference to FIG. 1A, the frame 101 forms a chamber 102 that encloses at least a portion of the deposition device 105, such as the spray nozzle 105S, the brush 105B, the roller 105R, or the solution-deposition planarization unit 105D of the deposition device 105. In one aspect, the chamber 102 encloses at least the portion of the deposition device 105, the base material deposition unit 104, and the base material support bed 103.

The reservoir 106 is configured to store the resin solution 180 and/or slurry 190 in any suitable manner. For example, the reservoir 106 may include a storage tank(s) for resin solution 180 and/or slurry 190 (e.g., where the resin solution 180 and slurry 190 are stored in respective storage tanks). The reservoir 106 is coupled to the deposition device 105 in any suitable manner, such as through suitable conduits, so as to supply the resin solution 180 and/or slurry 190 to the deposition device 105. The reservoir 106 may include any suitable pumps that may be controlled by the controller 170 to effect supply of the resin solution 180 and/or slurry 190 to the deposition device 105. The heater 108 is any suitable heater configured to heat the resin solution 180 and/or slurry 190 deposited upon the layer of base material 120, so as to reduce an amount of solvent 181, 195 in the resin solution 180 and/or slurry 190, which permits the stacked layers 151S (see FIGS. 4C, 5B, 5C, and 7B) of base material 120 to be consolidated with each other.

Referring to FIGS. 1A and 1E, the additively manufactured part 150 in accordance with the aspects of the present disclosure, as manufactured by the additive manufacturing apparatus 100, includes at least one layer of base material 120. At least the reinforcing agent 185, 193 is disposed on the at least one layer 151 of base material 120, where the reinforcing agent is deposited upon the at least one layer 151 as the resin solution 180 or the slurry 190 so as to at least partially fill one or more of the voids 201 and the pores 200 (FIG. 2A-2C) in the at least one layer 151 of base material 120. In one aspect, the conductive material 184 disposed on the at least one layer 151 of base material 120 (such as the polymeric material 121 or the polymer 123), where the conductive material 184 is deposited (in addition to or in lieu of the reinforcing agent 185, 193) upon the at least one layer 151 as the resin solution 180 or the slurry 190, so as to at least partially fill one or more of the voids 201 and the pores 200.

In one aspect, the at least one layer 151 of base material 120 includes more than one layer 151 of base material 120 (see layers 151, 151A, 151B). The reinforcing agent 185, 193, conductive material 184, and/or the barrier material 199 is interstitially disposed between adjacent layers 151 of the base material 120 (see FIGS. 4C, 5C, and 7B) and/or is disposed on the exterior surfaces 500, at least partially filling the one or more of the voids 201 and pores 200 (FIG.

2A-2C). The reinforcing agent 185, 193, conductive material 184, and/or the barrier material 199 at least partially fills the one or more of the voids 201 and pores 200 so as to reinforce coupling of the adjacent layers 151 of base material 120, provide conductivity (e.g., thermal and/or electrical conductivity), magnetic properties, and/or barrier properties (e.g., such as there the nano-platelets 185C are included in the slurry) to the additively manufactured part 150. In one aspect, the at least one layer 151 of base material 120 includes a polymer (e.g., such as included in the polymeric material 121 or the polymer 123). In another aspect, the at least one layer 151 of base material 120 includes a metal 122, which in one aspect includes metallic particles. In one aspect, the resin solution 180 or slurry 190, including the conductive material 184 and/or barrier material 199 is deposited upon predetermined portions 598 (FIG. 5C) of the at least one layer 151 of base material 120 so as to vary the conductive properties and/or properties of impermeability across the at least one layer 151 of base material 120, where a resin solution 180 or slurry 190 that does not include the conductive material 184 and/or the barrier material 199 is deposited on the other portions of the at least one layer 151. The deposit patterns of the resin solution 180 or slurry 190 may be aligned in predetermined directions so as to provide any desired anisotropic conductivity.

Referring now to FIGS. 1, 2A-2C, 3A, 3B, 6, 7, and 8, an exemplary method of additive manufacturing using the additive manufacturing apparatus 100 will be described. A layer 151 of base material 120 from which the additively manufactured part 150 is produced is deposited (FIG. 8, Block 800) onto the base material support bed 103. In one aspect (as shown in FIGS. 3A, 3B and 4A-4C), the layer 151 of base material 120 is formed by depositing (with, for example, a nozzle 310 of the base material deposition unit 104) a plurality of filaments 300 (where the plurality of filaments 300 include filaments 121F, 122F, 123F of one of the polymeric material 121, the metal 122, or the polymer 123) on the base material support bed 103 in a side-by-side arrangement. Where the base material 120 is deposited in the form of a filament 121F, 122F, 123F, a spacing or air gap 250A, 250B, 250C between adjacent filaments 121F, 122F, 123F (e.g., from a center of one filament to a center of an adjacent filament) may be adjusted to provide increased or decreased coupling between the adjacent filaments 121F, 122F, 123F. For example, the air gap 250A shown in FIG. 2A is smaller than the air gap 250B shown in FIG. 2B; and the air gap 250B shown in FIG. 2B is smaller than the air gap 250C shown in FIG. 2C. Likewise, the coupling area 260A between adjacent filaments 121F, 122F, 123F shown in FIG. 2A effected by the air gap 250A is larger than the coupling area 260B between adjacent filaments 121F, 122F, 123F shown in FIG. 2B effected by the air gap 250B; and the coupling area 260B between adjacent filaments 121F, 122F, 123F shown in FIG. 2B effected by the air gap 250B is larger than the coupling area 260C between adjacent filaments 121F, 122F, 123F shown in FIG. 2C effected by the air gap 250C. The voids 201 and/or pores 200 formed by the air gaps may be filled with the slurry 190, so that the air gap may be adjusted (e.g., larger or smaller) while maintaining substantially similar mechanical properties (e.g., tensile strength, etc.) of the additively manufactured part 150. In another aspect (as shown in FIGS. 6, 7A, and 7B), the layer 151 of base material 120 is formed by depositing (e.g., by spreading with, for example, doctor blade 620 of the base material deposition unit 104) a powdered base material 610 (where the powdered base material 610 includes powder 121P, 122P, 123P of one of the polymeric material 121, the metal 122, or the polymer 123) on the base material support bed 103.

Referring also to FIGS. 4A-4C and 6, the slurry 190 is deposited (e.g., by spraying, brushing, rolling, solution-deposition planarization, etc.) onto the layer 151 of base material 120 (FIG. 8, Block 810). In one aspect, depositing the slurry 190 onto the layer 151 of base material 120 includes spraying the slurry 190 onto the layer 151 of base material 120 with the spray nozzle 105S of the deposition device 105. In one aspect, the spray nozzle 105S is stationarily fixed to the frame 101 and the base material 120 deposited onto the base material support bed 103. In other aspects, the spray nozzle 105S of the deposition device 105 is movable and is positioned relative to the layer 151 of base material 120 with the computer controlled positioning mechanism 175. One or more of the voids 201 and/or pores 200 on a surface of the layer 151 of base material 120 are filled with the slurry 190 (FIG. 8, Block 820—see FIGS. 4B and 7A). As can be seen in FIGS. 4B and 7A, the layer 151 of base material 120 is planarized by the slurry 190 so that, when another layer 151 of the base material is deposited on top of the slurry 190, any voids 201 and/or pores 200 that may form between the adjacent layers 151 of base material 120 in the resulting stacked layers 151S is/are filled by the slurry 190.

Another layer 151 (see FIGS. 4C and 7B) of base material 120 is deposited on top of the layer 151 of base material upon which the slurry 190 has been applied (FIG. 8, Block 800) to form stacked layers 151S (see FIGS. 4C and 7B) of base material 120. The slurry 190 is deposited onto the other layer 151 of base material 120 (FIG. 8, Block 810—see FIGS. 4C and 7B) so that the one or more of the voids 201 and/or pores 200 on a surface of the other layer 151 of base material 120 are filled with the slurry 190 (FIG. 8, Block 820—see FIGS. 4C and 7B), where the slurry 190 at least partially fills the one or more of the voids 201 and pores 200 between adjacent layers 151 of the base material 120 in the stacked layers 151S of base material 120 so as to reinforce coupling of the adjacent layers 151 of base material 120.

In one aspect, one or more of a thermal conductivity, an electrical conductivity, and a permeability of an additively manufactured part formed by the base material 120 is modified with the slurry 190 (FIG. 8, Block 830). For example, referring to FIGS. 5A, 5B, and 5C, the slurry 190 includes one or more of the conductive material 184 and the barrier material 199 (FIG. 1B). As described above, where the base material 120 is deposited in the form of filaments 121F, 122F, 123F, the air gap 250A, 250B, 250C between adjacent filaments forms one or more of voids 201 and pores 200 that extend, in for example, an X direction of the additively manufactured part 150. The conductive material 184 settles in these voids 201 and/or pores 200 to form conductive pathways 520 (e.g., which may be akin/similar to wire conductors, each having an equivalent wire gauge or size) that also extend in the X direction. The wire gauge or size of these conductive pathways 520 may be controlled by setting the air gap 250A, 250B, 250C to effect a predetermined wire gauge of the conductive pathway 520, noting the wire gauges available may depend on a diameter of the filament 121F, 122F, 123F being deposited. Where the base material is deposited in the form of a powder 121P, 122P, 123P (as illustrated in FIG. 7B), the conductive material may settle in the voids 201 and/or pores 200 to form a conductive plane (or sheet) 700 between adjacent layers 151 of the base material 120. In this aspect, the conductive plane 700 may extend in the X and Y directions (e.g., the X-Y plane). The barrier material 199 may also settle within the voids 201 and/or pores 200 to form the barrier 400 to prevent fluids from passing between the adjacent filaments 121F, 122F, 123F.

The slurry 190 deposited upon the layer 151 of base material 120 is heated (FIG. 8. Block 840) so as to reduce an amount of solvent 195 in the slurry 190. Reducing the amount of solvent 195 facilitates the consolidation of the layers 151 of base material 120 to each other and the densification of the additively manufactured part 150 by curing the slurry 190 (e.g., one or more of the reinforcing agent 193, the conductive material 184, and the particles of structural material 194 bond to the adjacent layers 151 of base material 120, to the adjacent filaments 121F, 122F, 123F of the base material 120, and/or adjacent particles 600 (FIG. 6) of the powder 121P, 122P, 123P of the base material 120). The consolidation and densification of the additively manufactured part 150 as described above effects the substantially similar mechanical properties of the additively manufactured part 150 in both the X-Y plane and the Z direction.

Referring now to FIGS. 1, 2A-2C, 3A, 3B, 6, 7, and 9, an exemplary method of additive manufacturing using the additive manufacturing apparatus 100 will be described. A layer 151 of base material 120 from which the additively manufactured part 150 is produced is deposited (FIG. 9, Block 900) onto the base material support bed 103. In one aspect (as shown in FIGS. 3A, 3B and 4A-4C), the layer 151 of base material 120 is formed by depositing (with, for example, a nozzle 310 of the base material deposition unit 104) a plurality of filaments 300 (where the plurality of filaments 300 include filaments 121F, 122F, 123F of one of the polymeric material 121, the metal 122, or the polymer 123) on the base material support bed 103 in a side-by-side arrangement. Where the base material 120 is deposited in the form of a filament 121F, 122F, 123F, a spacing or air gap 250A, 250B, 250C between adjacent filaments 121F, 122F, 123F (e.g., from a center of one filament to a center of an adjacent filament) may be adjusted to provide increased or decreased coupling between the adjacent filaments 121F, 122F, 123F. For example, the air gap 250A shown in FIG. 2A is smaller than the air gap 250B shown in FIG. 2B; and, the air gap 250B shown in FIG. 2B is smaller than the air gap 250C shown in FIG. 2C. Likewise, the coupling area 260A between adjacent filaments 121F, 122F, 123F shown in FIG. 2A effected by the air gap 250A is larger than the coupling area 260B between adjacent filaments 121F, 122F, 123F shown in FIG. 2B effected by the air gap 250B; and, the coupling area 260B between adjacent filaments 121F, 122F, 123F shown in FIG. 2B effected by the air gap 250B is larger than the coupling area 260C between adjacent filaments 121F, 122F, 123F shown in FIG. 2C effected by the air gap 250C. The voids 201 and/or pores 200 formed by the air gaps may be filled with the slurry 190 so that the air gap may be adjusted (e.g., larger or smaller) while maintaining substantially similar mechanical properties (e.g., tensile strength, etc.) of the additively manufactured part 150. In another aspect (as shown in FIGS. 6, 7A, and 7B), the layer 151 of base material 120 is formed by depositing (e.g., by spreading with for example, doctor blade 620 of the base material deposition unit 104) a powdered base material 610 (where the powdered base material 610 includes powder 121P, 122P, 123P of one of the polymeric material 121, the metal 122, or the polymer 123) on the base material support bed 103.

The resin 183 is dissolved in the solvent 181 to form the resin solution 180 (FIG. 9, Block 910). Referring also to FIGS. 4A-4C and 6, the resin solution 180 is deposited (e.g., by spraying, brushing, rolling, solution-deposition planarization, etc.) onto the layer 151 of base material 120 (FIG. 9, Block 920). In one aspect, depositing the resin solution 180 onto the layer 151 of base material 120 includes spraying the resin solution 180 onto the layer 151 of base material 120 with the spray nozzle 105S of the deposition device 105. In one aspect, the spray nozzle 105S is stationarily fixed to the frame 101 and the base material 120 deposited onto the base material support bed 103. In other aspects, the spray nozzle 105S of the deposition device 105 is movable and is positioned relative to the layer 151 of base material 120 with the computer controlled positioning mechanism 175. One or more of the voids 201 and/or pores 200 on a surface of the layer 151 of base material 120 are filled with the resin solution 180 (FIG. 9, Block 930—see FIGS. 4B and 7A). As can be seen in FIGS. 4B and 7A, the layer 151 of base material 120 is planarized by the resin solution 180 so that, when another layer 151 of the base material is deposited on top of the resin solution 180, any voids 201 and/or pores 200 that may form between the adjacent layers 151 of base material 120 in the resulting stacked layers 151S is/are filled by the resin solution 180.

Another layer 151 (see FIGS. 4C and 7B) of base material 120 is deposited on top of the layer 151 of base material upon which the resin solution 180 has been applied (FIG. 9, Block 900) to form the stacked layers 151S (see FIGS. 4C and 7B) of base material 120. The resin solution 180 is deposited onto the other layer 151 of base material 120 (FIG. 9, Block 920—see FIGS. 4C and 7B) so that the one or more of the voids 201 and/or pores 200 on a surface of the other layer 151 of base material 120 are at least partially filled with the resin solution 180 (FIG. 9, Block 930—see FIGS. 4C and 7B), where the resin solution 180 at least partially fills the one or more of the voids 201 and pores 200 between adjacent layers 151 of the base material 120 in the stacked layers 151S of base material 120 so as to reinforce coupling of the adjacent layers 151 of base material 120.

In one aspect, one or more of a thermal conductivity, an electrical conductivity, and a permeability of an additively manufactured part formed by the base material 120 is modified with the resin solution (FIG. 9, Block 940). For example, referring to FIGS. 5A, 5B, and 5C, the resin solution 180 includes one or more of the conductive material 184 and the barrier material 199 (FIG. 1B). As described above, where the base material 120 is deposited in the form of filaments 121F, 122F, 123F, the air gap 250A, 250B, 250C between adjacent filaments forms one or more of voids 201 and pores 200 that extend in, for example, an X direction of the additively manufactured part 150. The conductive material 184 settles in these voids 201 and/or pores 200 to form conductive pathways 520 (e.g., which may be akin/similar to wire conductors, each having an equivalent wire gauge or size) that also extend in the X direction. The wire gauge or size of these conductive pathways 520 may be controlled by setting the air gap 250A, 250B, 250C to effect a predetermined wire gauge of the conductive pathway 520, noting the wire gauges available may depend on a diameter of the filament 121F, 122F, 123F being deposited. Where the base material is deposited in the form of a powder 121P, 122P, 123P (as illustrated in FIG. 7B), the conductive material may settle in the voids 201 and/or pores 200 to form a conductive plane (or sheet) 700 between adjacent layers 151 of the base material 120. In this aspect, the conductive plane 700 may extend in the X and Y directions (e.g., the X-Y plane). The barrier material 199 may also settle within the voids 201 and/or pores 200 to form the barrier 400 to prevent fluids from passing between the adjacent filaments 121F, 122F, 123F.

The resin solution 180 deposited upon the layer 151 of base material 120 is heated (FIG. 9, Block 950) so as to reduce an amount of solvent 195 in the resin solution 180. Reducing the amount of solvent 195 facilitates the consolidation of the layers 151 of base material 120 to each other and the densification of the additively manufactured part 150 by curing the resin 183 (e.g., one or more of the reinforcing agent 193 and the conductive material 184 bond to the adjacent layers 151 of base material 120, to the adjacent filaments 121F, 122F, 123F of the base material 120, and/or adjacent particles 600 (FIG. 6) of the powder 121P, 122P, 123P of the base material 120). The consolidation and densification of the additively manufactured part 150, as described above, effects the substantially similar mechanical properties of the additively manufactured part 150 in both the X-Y plane and the Z direction.

Referring now to FIGS. 1, 2A-2C, 3A, 3B, 6, 7, and 10, an exemplary method of additive manufacturing using the additive manufacturing apparatus 100 will be described. A layer 151 of polymeric material 121 (or a polymer 123 material) from which the additively manufactured part 150 is produced is deposited (FIG. 10, Block 1000) onto the base material support bed 103. In one aspect (as shown in FIGS. 3A, 3B and 4A-4C) the layer 151 of polymeric material 121 is formed by depositing (with for example, a nozzle 310 of the base material deposition unit 104) a plurality of filaments 300 on the base material support bed 103 in a side-by-side arrangement. Where the polymeric material 121 is deposited in the form of a filament 121F, a spacing or air gap 250A, 250B, 250C between adjacent filaments 121F (e.g., from a center of one filament to a center of an adjacent filament) may be adjusted to provide increased or decreased coupling between the adjacent filaments 121F. For example, the air gap 250A shown in FIG. 2A is smaller than the air gap 250B shown in FIG. 2B; and, the air gap 250B shown in FIG. 2B is smaller than the air gap 250C shown in FIG. 2C. Likewise, the coupling area 260A between adjacent filaments 121F shown in FIG. 2A effected by the air gap 250A is larger than the coupling area 260B between adjacent filaments 121F shown in FIG. 2B effected by the air gap 250B; and, the coupling area 260B between adjacent filaments 121F shown in FIG. 2B effected by the air gap 250B is larger than the coupling area 260C between adjacent filaments 121F, 122F, 123F shown in FIG. 2C effected by the air gap 250C. The voids 201 and/or pores 200 formed by the air gaps may be filled with the slurry 190 so that the air gap may be adjusted (e.g., larger or smaller) while maintaining substantially similar mechanical properties (e.g., tensile strength, etc.) of the additively manufactured part 150. In another aspect (as shown in FIGS. 6, 7A, and 7B), the layer 151 of polymeric material 121 is formed by depositing (e.g., by spreading with, for example, doctor blade 620 of the base material deposition unit 104) a powdered base material 610 (where the powdered base material 610 includes powder 121P of the polymeric material 121) on the base material support bed 103.

Referring also to FIGS. 4A-4C and 6, the slurry 190 is deposited (e.g., by spraying, brushing, rolling, solution-deposition planarization, etc.) onto the layer 151 of polymeric material 121 to impart at least conductive properties to the polymeric material 121 (FIG. 10, Block 1010), where the slurry 190 includes the conductive material 184. In other aspects, one or more of magnetic properties and properties of impermeability may be imparted by the slurry 190 to the polymeric material 121 (FIG. 10, Blocks 1015, 1016), e.g., such as where the slurry includes the magnetic materials and/or nano-platelets described above.

In one aspect, depositing the slurry 190 onto the layer 151 of polymeric material 121 includes spraying the slurry 190 onto the layer 151 of polymeric material 121 with the spray nozzle 105S of the deposition device 105. In one aspect, the spray nozzle 105S is stationarily fixed to the frame 101 and the polymeric material 121 deposited onto the base material support bed 103. In other aspects, the spray nozzle 105S of the deposition device 105 is movable and is positioned relative to the layer 151 of polymeric material 121 with the computer controlled positioning mechanism 175. One or more of the voids 201 and/or pores 200 on a surface of the layer 151 of polymeric material 121 are filled with the slurry 190 (FIG. 10, Block 1020—see FIGS. 4B and 7A). As can be seen in FIGS. 4B and 7A, the layer 151 of base material 120 is planarized by the slurry 190 so that when another layer 151 of the base material is deposited on top of the slurry 190 any voids 201 and/or pores 200 that may form between the adjacent layers 151 of base material 120 in the resulting stacked layers 151S is/are filled by the slurry 190.

Another layer 151 (see FIGS. 4C and 7B) of polymeric material 121 is deposited on top of the layer 151 of polymeric material 121 upon which the slurry 190 has been applied (FIG. 10, Block 1000) to form stacked layers 151S (see FIGS. 4C and 7B) of polymeric material 121 where one or more layers 151 in the stacked layers 151S is imparted at least conductive properties. The layer of polymeric material 121 and the slurry 190 are alternately deposited to form the stacked layers 151S of polymeric material 121 with the slurry 190 interstitially disposed between the stacked layers 151S of polymeric material 121. As described above, the slurry 190 may also impart magnetic properties and/or properties of impermeability to the one or more layers 151 in the stacked layers 151S (FIG. 10, Blocks 1015, 1016). The slurry 190 is deposited onto the other layer 151 of polymeric material 121 (FIG. 10, Block 1010—see FIGS. 4C and 7B), so that the one or more of the voids 201 and/or pores 200 on a surface of the other layer 151 of polymeric material 121 are filled with the slurry 190 (FIG. 10, Block 1020—see FIGS. 4C and 7B), where the slurry 190 at least partially fills the one or more of the voids 201 and pores 200 between adjacent layers 151 of the base material 120 in the stacked layers 151S of polymeric material 121 so as to reinforce coupling of the adjacent layers 151 of polymeric material 121.

In one aspect, one or more conductive pathways 250 are formed in the additively manufactured part 150 (FIG. 10, Block 1030). For example, referring to FIGS. 5A, 5B, and 5C, the slurry 190 includes at least the conductive material 184 (FIG. 1B). As described above, where the polymeric material 121 is deposited in the form of filaments 121F, the air gap 250A, 250B, 250C between adjacent filaments 121F forms one or more of voids 201 and pores 200 that extend, in for example, an X direction of the additively manufactured part 150. The conductive material 184 settles (e.g., the slurry 190 at least partially fills the one or more of voids 201 and/or pores 200 between adjacent layers 151 of the polymeric material 121 in the stacked layers 151S of polymeric material 121) in these voids 201 and/or pores 200 to form the conductive pathways 520 (e.g., which may be akin/similar to wire conductors, each having an equivalent wire gauge or size) that also extend in the X direction. The wire gauge or size of these conductive pathways 520 may be controlled by setting the air gap 250A, 250B, 250C to effect a predetermined wire gauge of the conductive pathway 520, noting the wire gauges available may depend on a diameter of the filament 121F, 122F, 123F being deposited. Where the polymeric material 121 is deposited in the form of a powder 121P (as illustrated in FIG. 7B), the conductive material may settle in the voids 201 and/or pores 200 to form a conductive plane (or sheet) 700 between adjacent layers 151 of the polymeric material 121. In this aspect, the conductive plane 700 may extend in the X and Y directions (e.g., the X-Y plane).

The slurry 190 deposited upon the layer 151 of polymeric material 121 is heated (FIG. 10, Block 1040), so as to reduce an amount of solvent 195 in the slurry 190. Reducing the amount of solvent 195 facilitates the consolidation of the layers 151 of polymeric material 121 to each other and the densification of the additively manufactured part 150 by curing the slurry 190 (e.g., one or more of the reinforcing agent 193, the conductive material 184, and the particles of structural material 194 bond to the adjacent layers 151 of base material 120, to the adjacent filaments 121F of the polymeric material 121, and/or adjacent particles 600 (FIG. 6) of the powder 121P of the polymeric material 121). The consolidation and densification of the additively manufactured part 150, as described above, effects the substantially similar mechanical properties of the additively manufactured part 150 in both the X-Y plane and the Z direction.

Figure 7:
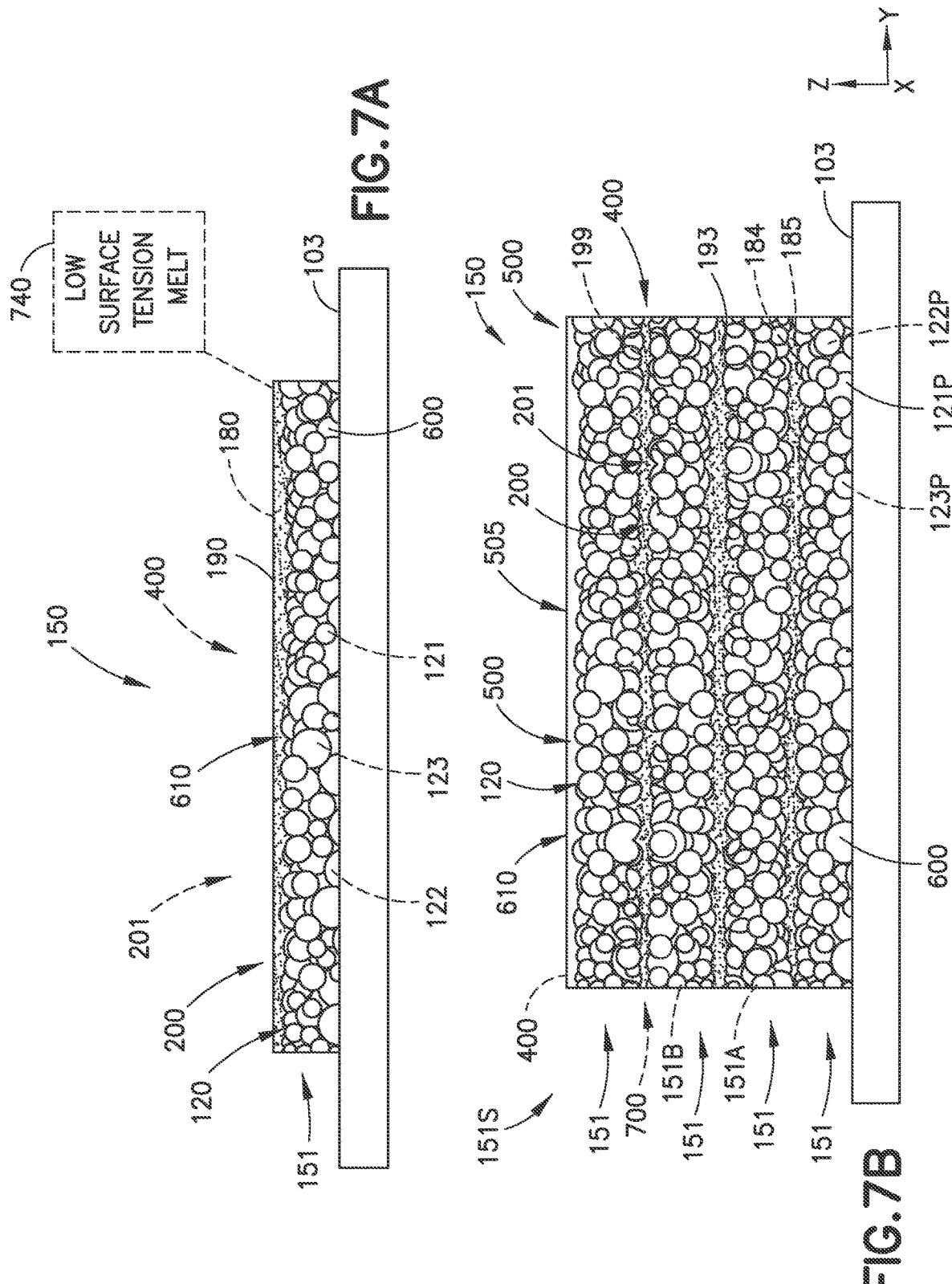

Still referring to FIGS. 1, 2A-2C, 3A, 3B, 6, 7, and 10, another exemplary method of additive manufacturing using the additive manufacturing apparatus 100 will be described. A layer 151 of polymeric material 121 (or a polymer 123 material) from which the additively manufactured part 150 is produced is deposited (FIG. 10, Block 1000) onto the base material support bed 103. In one aspect (as shown in FIGS. 3A, 3B and 4A-4C) the layer 151 of polymeric material 121 is formed by depositing (with for example, a nozzle 310 of the base material deposition unit 104) a plurality of filaments 300 on the base material support bed 103 in a side-by-side arrangement. Where the polymeric material 121 is deposited in the form of a filament 121F, a spacing or air gap 250A, 250B, 250C between adjacent filaments 121F (e.g., from a center of one filament to a center of an adjacent filament) may be adjusted to provide increased or decreased coupling between the adjacent filaments 121F. For example, the air gap 250A shown in FIG. 2A is smaller than the air gap 250B shown in FIG. 2B; and, the air gap 250B shown in FIG. 2B is smaller than the air gap 250C shown in FIG. 2C. Likewise, the coupling area 260A between adjacent filaments 121F shown in FIG. 2A effected by the air gap 250A is larger than the coupling area 260B between adjacent filaments 121F shown in FIG. 2B effected by the air gap 250B; and, the coupling area 260B between adjacent filaments 121F shown in FIG. 2B effected by the air gap 250B is larger than the coupling area 260C between adjacent filaments 121F, 122F, 123F shown in FIG. 2C effected by the air gap 250C. The voids 201 and/or pores 200 formed by the air gaps may be filled with the slurry 190, so that the air gap may be adjusted (e.g., larger or smaller) while maintaining substantially similar mechanical properties (e.g., tensile strength, etc.) of the additively manufactured part 150. In another aspect (as shown in FIGS. 6, 7A, and 7B), the layer 151 of polymeric material 121 is formed by depositing (e.g., by spreading with for example, doctor blade 620 of the base material deposition unit 104) a powdered base material 610 (where the powdered base material 610 includes powder 121P of the polymeric material 121) on the base material support bed 103.

Referring also to FIGS. 4A-4C and 6, the slurry 190 is deposited (e.g., by spraying, brushing, rolling, solution-deposition planarization, etc.) onto the layer 151 of polymeric material 121 to impart at least barrier properties to the polymeric material 121 (FIG. 10, Block 1016), where the slurry 190 includes the barrier material 199 (FIG. 1B). In other aspects, one or more of magnetic properties and properties of conductive properties may be imparted by the slurry 190 to the polymeric material 121 (FIG. 10, Blocks 1010, 1015), e.g., such as where the slurry includes the magnetic materials and/or nano-platelets described above.

In one aspect, depositing the slurry 190 onto the layer 151 of polymeric material 121 includes spraying the slurry 190 onto the layer 151 of polymeric material 121 with the spray nozzle 105S of the deposition device 105. In one aspect, the spray nozzle 105S is stationarily fixed to the frame 101 and the polymeric material 121 deposited onto the base material support bed 103. In other aspects, the spray nozzle 105S of the deposition device 105 is movable and is positioned relative to the layer 151 of polymeric material 121 with the computer controlled positioning mechanism 175. One or more of the voids 201 and/or pores 200 on a surface of the layer 151 of polymeric material 121 are filled with the slurry 190 (FIG. 10, Block 1020—see FIGS. 4B and 7A). As can be seen in FIGS. 4B and 7A, the layer 151 of base material 120 is planarized by the slurry 190 so that, when another layer 151 of the base material is deposited on top of the slurry 190, any voids 201 and/or pores 200 that may form between the adjacent layers 151 of base material 120 in the resulting stacked layers 151S is/are filled by the slurry 190.

Another layer 151 (see FIGS. 4C and 7B) of polymeric material 121 is deposited on top of the layer 151 of polymeric material 121 upon which the slurry 190 has been applied (FIG. 10, Block 1000) to form stacked layers 151S (see FIGS. 4C and 7B) of polymeric material 121 where one or more layers 151 in the stacked layers 151S is imparted at least properties of impermeability. The layer of polymeric material 121 and the slurry 190 are alternately deposited to form the stacked layers 151S of polymeric material 121 with the slurry 190 interstitially disposed between the stacked layers 151S of polymeric material 121. As described above, the slurry 190 may also impart conductive properties and/or magnetic properties to the one or more layers 151 in the stacked layers 151S (FIG. 10, Blocks 1010, 1015). The slurry 190 is deposited onto the other layer 151 of polymeric material 121 (FIG. 10, Block 1016—see FIGS. 4C and 7B) so that the one or more of the voids 201 and/or pores 200 on a surface of the other layer 151 of polymeric material 121 are filled with the slurry 190 (FIG. 10, Block 1020—see FIGS. 4C and 7B), where the slurry 190 at least partially fills the one or more of the voids 201 and pores 200 between adjacent layers 151 of the base material 120 in the stacked layers 151S of polymeric material 121 so as to reinforce coupling of the adjacent layers 151 of polymeric material 121.

In one aspect, one or more conductive pathways 250 are formed in the additively manufactured part 150 (FIG. 10, Block 1030), such as for example, referring to FIGS. 5A, 5B, and 5C, when the slurry 190 includes the conductive material 184 (FIG. 1B). As described above, where the polymeric material 121 is deposited in the form of filaments 121F the air gap 250A, 250B, 250C between adjacent filaments 121F forms one or more of voids 201 and pores 200 that extend in, for example, an X direction of the additively manufactured part 150. The conductive material 184 settles (e.g., the slurry 190 at least partially fills the one or more of voids 201 and/or pores 200 between adjacent layers 151 of the polymeric material 121 in the stacked layers 151S of polymeric material 121) in these voids 201 and/or pores 200 to form the conductive pathways 520 (e.g., which may be akin/similar to wire conductors, each having an equivalent wire gauge or size) that also extend in the X direction. The wire gauge or size of these conductive pathways 520 may be controlled by setting the air gap 250A, 250B, 250C to effect a predetermined wire gauge of the conductive pathway 520, noting the wire gauges available may depend on a diameter of the filament 121F, 122F, 123F being deposited. Where the polymeric material 121 is deposited in the form of a powder 121P (as illustrated in FIG. 7B), the conductive material may settle in the voids 201 and/or pores 200 to form a conductive plane (or sheet) 700 between adjacent layers 151 of the polymeric material 121. In this aspect, the conductive plane 700 may extend in the X and Y directions (e.g., the X-Y plane).

The slurry 190 deposited upon the layer 151 of polymeric material 121 is heated (FIG. 10. Block 1040) so as to reduce an amount of solvent 195 in the slurry 190. Reducing the amount of solvent 195 facilitates the consolidation of the layers 151 of polymeric material 121 to each other and the densification of the additively manufactured part 150 by curing the slurry 190 (e.g., one or more of the reinforcing agent 193, the conductive material 184, and the particles of structural material 194 bond to the adjacent layers 151 of base material 120, to the adjacent filaments 121F of the polymeric material 121, and/or adjacent particles 600 (FIG. 6) of the powder 121P of the polymeric material 121). The consolidation and densification of the additively manufactured part 150 as described above effects the substantially similar mechanical properties of the additively manufactured part 150 in both the X-Y plane and the Z direction.

In the above-described methods, in one aspect, the resin solution 180 or slurry 190, including the conductive material 184 and/or barrier material 199 is deposited upon predetermined portions 598 (FIG. 5C) of the at least one layer 151 of base material 120 so as to vary the conductive properties and/or properties of impermeability across the at least one layer 151 of base material 120, where a resin solution 180 or slurry 190 that does not include the conductive material 184 and/or the barrier material 199 is deposited on the other portions of the at least one layer 151. The deposit patterns of the resin solution 180 or slurry 190 may be aligned in predetermined directions so as to provide any desired anisotropic conductivity. In the above-described methods, in one aspect, the resin solution 180 or slurry may be deposited on the exterior surface(s) 500 (see FIG. 5A) of the additively manufactured part 150 so as to provide a better (e.g., smoother, where the voids 201 and/or pores 200 are at least partially filled in) surface finish 505 compared to an exterior surface 500 where the voids 201 and/or pores 200 are not filled in by the slurry 190 or resin solution 180.

The following are provided in accordance with the aspects of the present disclosure:

A1. A method of additive manufacturing, the method comprising:
depositing a layer of polymeric material from which an additively manufactured part is produced; and
depositing a slurry upon the layer of polymeric material, wherein the slurry includes a conductive material that imparts conductive properties to the layer of polymeric material.

A2. The method of paragraph A1, wherein the slurry includes a barrier material that imparts properties of impermeability to the layer of polymeric material.

A3. The method of paragraph A2, wherein the barrier material comprises nano-clay platelets.

A4. The method of paragraph A1 (or A3), wherein depositing the layer of polymeric material includes depositing a plurality of filaments of polymeric material in a side-by-side arrangement so as to form the layer of polymeric material, where
the layer of polymeric material includes one or more of voids and pores, and
depositing the slurry upon the layer of polymeric material at least partially fills the one or more of voids and pores.

A5. The method of paragraph A1 (or A3), wherein depositing the layer of polymeric material includes depositing a powdered polymeric material so as to form the layer of polymeric material, where
the layer of polymeric material includes one or more of voids and pores, and
depositing the slurry upon the layer of polymeric material at least partially fills the one or more of voids and pores.

A6. The method of paragraph A1 (or A2-A5), further comprising depositing another layer of polymeric material on top of the layer of polymeric material upon which the slurry has been deposited.

A7. The method of paragraph A6, further comprising at least partially filling one or more of voids and pores between the layer of polymeric material and the other layer of polymeric material with the slurry.

A8. The method of paragraph A7, wherein filling the one or more of voids and pores with the slurry forms one or more conductive pathways through a stack of layers of polymeric material formed by the layer of polymeric material and the other layer of polymeric material.

A9. The method of paragraph A1, further comprising filling voids on a surface of the layer of polymeric material with the slurry.

A10. The method of paragraph A1 (or any of the preceding paragraphs), wherein depositing the slurry upon the layer of polymeric material includes spraying, with a deposition device, the slurry upon the layer of polymeric material.

A11. The method of paragraph A10, further comprising positioning the deposition device relative to the layer of polymeric material with a computer controlled positioning mechanism.

A12. The method of paragraph A1 (or A2-A9), wherein depositing the slurry upon the layer of polymeric material includes spraying the slurry upon the layer of polymeric material with a deposition device that is fixed relative to the layer of polymeric material.

A13. The method of paragraph A1 (or any of the preceding paragraphs), wherein the conductive properties include one or more of thermal conductivity and electrical conductivity.

A14. The method of paragraph A1 (or any of the preceding paragraphs), wherein the slurry includes a reinforcing agent.

A15. The method of paragraph A1 (or any of the preceding paragraphs), wherein the slurry is deposited upon predetermined portions of the layer of polymeric material so as to vary the conductive properties across the layer of polymeric material.

A16. The method of paragraph A1 (or any of the preceding paragraphs) wherein the conductive material includes one or more of a metal, a conducting polymer, nano-silver, and carbon based nanomaterials.

A17. The method of paragraph A16, wherein the carbon based nanomaterials include graphene, graphene derivatives, and carbon nanotubes.

A18. The method of paragraph A1 (or any of the preceding paragraphs) wherein the slurry imparts magnetic properties to the layer of polymeric material.

B1. A method of additive manufacturing, the method comprising:
depositing a layer of polymeric material; and
depositing a slurry upon the layer of polymeric material, wherein the slurry includes a conductive material that imparts conductive properties to the layer of polymeric material;
wherein the layer of polymeric material and the slurry are alternately deposited to form stacked layers of polymeric material with the slurry interstitially disposed between the stacked layers of polymeric material, the slurry at least partially filling one or more of voids and pores between adjacent layers of polymeric material in the stacked layers of polymeric material so as to form conductive pathways between the adjacent layers of polymeric material.

B2. The method of paragraph B1, wherein the slurry includes a barrier material that imparts properties of impermeability to the layer of polymeric material.

B3. The method of paragraph B2, wherein the barrier material comprises nano-clay platelets.

B4. The method of paragraph B1 (or B3), wherein depositing the layer of polymeric material includes depositing a plurality of filaments of polymeric material in a side-by-side arrangement so as to form the layer of polymeric material, where the layer of polymeric material includes one or more of voids and pores.

B5. The method of paragraph B1 (or B3), wherein depositing the layer of polymeric material includes depositing a powdered polymeric material so as to form the layer of polymeric material, where the layer of polymeric material includes one or more of voids and pores.

B6. The method of paragraph B 1, further comprising filling voids on a surface of the stacked layers of polymeric material with the slurry.

B7. The method of paragraph B1 (or any of the preceding paragraphs), wherein depositing the slurry upon the layer of polymeric material includes spraying, with a deposition device, the slurry upon the layer of polymeric material.

B8. The method of paragraph B7, further comprising positioning the deposition device relative to the layer of polymeric material with a computer controlled positioning mechanism.

B9. The method of paragraph B1 (or B2-B6), wherein depositing the slurry upon the layer of polymeric material includes spraying the slurry upon the layer of polymeric material with a deposition device that is fixed relative to the layer of polymeric material.

B10. The method of paragraph B1 (or any of the preceding paragraphs), wherein the conductive properties include one or more of thermal conductivity and electrical conductivity.

B11. The method of paragraph B1 (or any of the preceding paragraphs), wherein the slurry includes a reinforcing agent.

B12. The method of paragraph B1 (or any of the preceding paragraphs), wherein the slurry is deposited upon predetermined portions of the layer of polymeric material so as to vary the conductive properties within the stacked layers of polymeric material.

B13. The method of paragraph B1 (or any of the preceding paragraphs) wherein the conductive material includes one or more of a metal, a conducting polymer, nano-silver, and carbon based nanomaterials.

B14. The method of paragraph B13, wherein the carbon based nanomaterials include graphene, graphene derivatives, and carbon nanotubes.

B15. The method of paragraph B1 (or any of the preceding paragraphs) wherein the slurry imparts magnetic properties to the layer of polymeric material.

C1. An additively manufactured part comprising:
at least one layer of polymeric material; and
a conductive material disposed on the at least one layer of polymeric material, where the conductive material is deposited upon the at least one layer of polymeric material as a slurry so as to at least partially fill one or more of voids and pores in the at least one layer of polymeric material, wherein the conductive material imparts conductive properties to the layer of polymeric material.

C2. The additively manufactured part of paragraph C1, wherein the at least one layer of polymeric material comprises more than one layer of polymeric material, the conductive material being interstitially disposed between adjacent layers of polymeric material, at least partially filling the one or more of voids and pores, so as to form conductive pathways between the adjacent layers of polymeric material.

C3. The additively manufactured part of paragraph C1, wherein the at least one layer of polymeric material comprises more than one layer of polymeric material, the slurry being interstitially disposed between adjacent layers of polymeric material, at least partially filling the one or more of voids and pores, where the slurry includes a reinforcing agent so as to reinforce coupling of the adjacent layers of polymeric material.

C4. The additively manufactured part of paragraph C1 (or C2-C3), wherein the reinforcing agent is polymeric.

C5. The additively manufactured part of paragraph C1 (or C2-C3), wherein the reinforcing agent is non-polymeric.

C6. The additively manufactured part of paragraph C1 (or C2-C3), wherein the reinforcing agent includes one or more of nanoparticles, two-dimensional organic or inorganic nano-sheets, carbon nanotubes, nano-platelets, and graphene.

C7. The additively manufactured part of paragraph C1 (or C2-C3), wherein the reinforcing agent includes one or more of graphene, graphene reinforced filaments, and graphene derivatives.

C8. The additively manufactured part of paragraph C1 (or C2-C7) wherein the conductive material imparts magnetic properties to the additively manufactured part.

C9. The additively manufactured part of paragraph C1 (or any of the preceding paragraphs), wherein the slurry is deposited upon predetermined portions of the at least one layer of polymeric material so as to vary the conductive properties across the at least one layer of polymeric material.

C10. The additively manufactured part of paragraph C1 (or any of the preceding paragraphs) wherein the conductive material includes one or more of metal, a conducting polymer, nano-silver, and carbon based nanomaterials.

C11. The additively manufactured part of paragraph C10, wherein the carbon based nanomaterials include graphene, graphene derivatives, and carbon nanotubes.

D1. A method of additive manufacturing, the method comprising:
depositing a layer of polymeric material from which an additively manufactured part is produced; and
depositing a slurry upon the layer of polymeric material, wherein the slurry includes a barrier material that that imparts properties of impermeability to the layer of polymeric material.

D2. The method of paragraph D1, wherein the barrier material comprises nano-clay platelets.

D3. The method of paragraph D1 (or D2), wherein depositing the layer of polymeric material includes depositing a plurality of filaments of polymeric material in a side-by-side arrangement so as to form the layer of polymeric material, where
the layer of polymeric material includes one or more of voids and pores, and
depositing the slurry upon the layer of polymeric material at least partially fills the one or more of voids and pores.

D4. The method of paragraph D1 (or D2), wherein depositing the layer of polymeric material includes depositing a powdered polymeric material so as to form the layer of polymeric material, where
the layer of polymeric material includes one or more of voids and pores, and
depositing the slurry upon the layer of polymeric material at least partially fills the one or more of voids and pores.

D5. The method of paragraph D1 (or D2-D4), further comprising depositing another layer of polymeric material on top of the layer of polymeric material upon which the slurry has been deposited.

D6. The method of paragraph D5, further comprising at least partially filling one or more of voids and pores between the layer of polymeric material and the other layer of polymeric material with the slurry.

D7. The method of paragraph D6, wherein filling the one or more of voids and pores with the slurry forms one or more conductive pathways through a stack of layers of polymeric material formed by the layer of polymeric material and the other layer of polymeric material.

D8. The method of paragraph D1, further comprising filling voids on a surface of the layer of polymeric material with the slurry.

D9. The method of paragraph D1 (or any of the preceding paragraphs), wherein depositing the slurry upon the layer of polymeric material includes spraying, with a deposition device, the slurry upon the layer of polymeric material.

D10. The method of paragraph D9, further comprising positioning the deposition device relative to the layer of polymeric material with a computer controlled positioning mechanism.

D11. The method of paragraph D1 (or D2-D7), wherein depositing the slurry upon the layer of polymeric material includes spraying the slurry upon the layer of polymeric material with a deposition device that is fixed relative to the layer of polymeric material.

D12. The method of paragraph D1 (or any of the preceding paragraphs), wherein the slurry includes a reinforcing agent.

D13. The method of paragraph D1 (or any of the preceding paragraphs), wherein the slurry is deposited upon predetermined portions of the layer of polymeric material so as to vary the properties of impermeability across the layer of polymeric material.

E1. A method of additive manufacturing, the method comprising:
depositing a layer of polymeric material; and
depositing a slurry upon the layer of polymeric material, wherein the slurry includes a barrier material that that imparts properties of impermeability to the layer of polymeric material;
wherein the layer of polymeric material and the slurry are alternately deposited to form stacked layers of polymeric material with the slurry interstitially disposed between the stacked layers of polymeric material, the slurry at least partially filling one or more of voids and pores between adjacent layers of polymeric material in the stacked layers of polymeric material so as to form one or more barriers between the adjacent layers of polymeric material, where the one or more barriers include the properties of impermeability.

E2. The method of paragraph E1, wherein the one or more barriers include a barrier material comprising nano-clay platelets.

E3. The method of paragraph E1 (or E2), wherein depositing the layer of polymeric material includes depositing a plurality of filaments of polymeric material in a side-by-side arrangement so as to form the layer of polymeric material, where the layer of polymeric material includes one or more of voids and pores.

E4. The method of paragraph E1 (or E2), wherein depositing the layer of polymeric material includes depositing a powdered polymeric material so as to form the layer of polymeric material, where the layer of polymeric material includes one or more of voids and pores.

E5. The method of paragraph E1, further comprising filling voids on a surface of the stacked layers of polymeric material with the slurry.

E6. The method of paragraph E1 (or any of the preceding paragraphs), wherein depositing the slurry upon the layer of polymeric material includes spraying, with a deposition device, the slurry upon the layer of polymeric material.

E7. The method of paragraph E6, further comprising positioning the deposition device relative to the layer of polymeric material with a computer controlled positioning mechanism.

E8. The method of paragraph E1 (or E2-E5), wherein depositing the slurry upon the layer of polymeric material includes spraying the slurry upon the layer of polymeric material with a deposition device that is fixed relative to the layer of polymeric material.

E9. The method of paragraph E1 (or any of the preceding paragraphs), wherein the slurry includes a reinforcing agent.

F1. An additively manufactured part comprising:
at least one layer of polymeric material; and
a barrier material disposed on the at least one layer of polymeric material, where the barrier material is deposited upon the at least one layer of polymeric material as a slurry so as to at least partially fill one or more of voids and pores in the at least one layer of polymeric material, wherein the barrier material that imparts properties of impermeability to the layer of polymeric material.

F2. The additively manufactured part of paragraph F1, wherein the at least one layer of polymeric material comprises more than one layer of polymeric material, the barrier material being interstitially disposed between adjacent layers of polymeric material, at least partially filling the one or more of voids and pores, so as to form one or more barriers between the adjacent layers of polymeric material where the one or more barriers include the properties of impermeability.

F3. The additively manufactured part of paragraph F1, wherein the at least one layer of polymeric material comprises more than one layer of polymeric material, the slurry being interstitially disposed between adjacent layers of polymeric material, at least partially filling the one or more of voids and pores, where the slurry includes a reinforcing agent so as to reinforce coupling of the adjacent layers of polymeric material.

F4. The additively manufactured part of paragraph F1 (or F2-F3), wherein the reinforcing agent is polymeric.

F5. The additively manufactured part of paragraph F1 (or F2-F3), wherein the reinforcing agent is non-polymeric.

F6. The additively manufactured part of paragraph F1 (or F2-F3), wherein the reinforcing agent includes one or more of nanoparticles, two-dimensional organic or inorganic nano-sheets, carbon nanotubes, nano-platelets, and graphene.

F7. The additively manufactured part of paragraph F1 (or F2-F3), wherein the reinforcing agent includes one or more of graphene, graphene reinforced filaments, and graphene derivatives.

F8. The additively manufactured part of paragraph F1 (or any of the preceding paragraphs), wherein the slurry is deposited upon predetermined portions of the layer of polymeric material so as to vary the properties of impermeability across the at least one layer of polymeric material.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 8-10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8-10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of additive manufacturing, the method comprising:
   depositing at least two layers of polymeric material from which an additively manufactured part is produced, the at least two layers being deposited in a stack; and
   depositing a slurry upon the a surface of one or more of the at least two layers of polymeric material, wherein the surface is an interface surface between adjacent layers in the stack and the slurry includes a conductive material that imparts conductive properties in a distinct conductive layer at the interface surface between adjacent layers of polymeric material, where the polymeric material at the interface surface forms one of a channel and plane and the slurry is configured such that the conductive material settles within one or more of voids and pores of the interface surface and into one or more of voids and pores of an adjacent layer to form the distinct conductive layer that spans the interface surface.

2. The method of claim 1, wherein the slurry includes a nano-clay platelet barrier material that imparts properties of impermeability to a layer of the at least two layers of polymeric material.

3. The method of claim 1, wherein depositing the layer of polymeric material includes depositing a powdered polymeric material so as to form the layer of polymeric material, where
   the layer of polymeric material includes one or more of voids and pores, and
   depositing the slurry upon the layer of polymeric material at least partially fills the one or more of voids and pores.

4. The method of claim 1, further comprising depositing another layer of polymeric material on top of the layer of polymeric material upon which the slurry has been deposited.

5. The method of claim 4, further comprising at least partially filling one or more of voids and pores between the layer of polymeric material and the other layer of polymeric material with the slurry.

6. The method of claim 5, wherein filling the one or more of voids and pores with the slurry forms one or more conductive pathways through a stack of layers of polymeric material formed by the layer of polymeric material and the other layer of polymeric material.

7. The method of claim 1, wherein the conductive properties include one or more of thermal conductivity and electrical conductivity.

8. The method of claim 1, wherein the slurry includes a reinforcing agent.

9. The method of claim 1, wherein the slurry is deposited upon predetermined portions of the layer of polymeric material so as to vary the conductive properties across the layer of polymeric material.

10. A method of additive manufacturing, the method comprising:
    depositing a layer of polymeric material; and
    depositing a slurry upon the layer of polymeric material, wherein the slurry includes a conductive material that imparts conductive properties to the layer of polymeric material;
    wherein the layer of polymeric material and the slurry are alternately deposited to form stacked layers of polymeric material with the slurry interstitially disposed between the stacked layers of polymeric material, the slurry at least partially filling one or more of voids and pores at an interface plane between adjacent layers of polymeric material in the stacked layers of polymeric material where the one or more of voids and pores form channels each having a predefined cross-sections and the slurry is configured such that the conductive material settles within each channel so as to form conductive pathways between the adjacent layers of polymeric material, and each of the conductive pathways is separate and distinct from each other conductive pathway formed on a same interface plane and an adjacent stacked interface plane.

11. The method of claim 10, wherein the slurry includes a nano-clay platelet barrier material that imparts properties of impermeability to the layer of polymeric material.

12. The method of claim 10, wherein depositing the layer of polymeric material includes depositing a plurality of filaments of polymeric material in a side-by-side arrangement so as to form the layer of polymeric material, where the layer of polymeric material includes one or more of voids and pores.

13. The method of claim 12, wherein a gauge of the conductive pathway is defined by the predefined cross-section and the gauge is controlled by setting an air gap between adjacent filaments.

14. The method of claim 10, further comprising filling voids on a surface of the stacked layers of polymeric material with the slurry.

15. The method of claim 10, wherein depositing the slurry upon the layer of polymeric material includes spraying, with a deposition device, the slurry upon the layer of polymeric material.

16. The method of claim 10, wherein the slurry includes a nano-clay platelet barrier material that imparts properties of impermeability to the layer of polymeric material.

17. An additively manufactured part comprising:
    stacked layers of polymeric material, each layer being joined to an adjacent layer in the stacked layers at an interface plane; and
    a conductive material disposed on the at least one layer of polymeric material, where the conductive material is deposited upon the at least one layer of polymeric material as a slurry so as to at least partially fill one or more of voids and pores in the at least one layer of polymeric material, wherein
    the conductive material imparts conductive properties to the at least one layer of polymeric material at the interface plane, and
    the slurry is configured to one of
        separate each of the stacked layers so as to form a separate and distinct conductive layer between adjacent layers in the stacked layers that is separate and distinct from other conductive layers at other interface planes between adjacent layers in the stacked layers, and
        at least partially fill one or more channels each having a predefined cross section so as to form conductive pathways where each conductive pathway is separate and distinct from each other conductive pathway formed on a same interface plane and an adjacent stacked interface plane.

18. The additively manufactured part of claim 17, wherein the stacked layers of polymeric material comprises filaments of polymeric material and a gauge of the conductive pathways between the adjacent layers of polymeric material depends on a size of an air gap between adjacent filaments.

19. The additively manufactured part of claim 17, wherein the at least one layer of polymeric material comprises more than one layer of polymeric material, the slurry being interstitially disposed between adjacent layers of polymeric material, at least partially filling the one or more of voids and pores, where the slurry includes a reinforcing agent so as to reinforce coupling of the adjacent layers of polymeric material.

20. The additively manufactured part of claim 17, wherein the slurry is deposited upon predetermined portions of the at least one layer of polymeric material so as to vary the conductive properties across the at least one layer of polymeric material.

* * * * *